United States Patent [19]

Hasegawa et al.

[11] Patent Number: 5,414,736
[45] Date of Patent: May 9, 1995

[54] FSK DATA RECEIVING SYSTEM

[75] Inventors: Makoto Hasegawa, Tokyo; Kazuaki Takahashi, Kawasaki; Masahiro Mimura, Tokyo; Kazunori Watanabe; Katsushi Yokozaki, both of Yokohama; Hiroyuki Harada, Kawasaki, all of Japan

[73] Assignee: Matsushita Electric Industrial Co., Ltd., Osaka, Japan

[21] Appl. No.: 925,673

[22] Filed: Aug. 7, 1992

[30] Foreign Application Priority Data

Aug. 12, 1991 [JP] Japan .................................. 3-201677
Aug. 12, 1991 [JP] Japan .................................. 3-201678
Sep. 27, 1991 [JP] Japan .................................. 3-249025

[51] Int. Cl.⁶ .............................................. H03D 3/00
[52] U.S. Cl. ..................................... 375/334; 375/272; 329/302; 331/179; 455/208
[58] Field of Search ......................... 375/88, 97, 45; 331/179; 329/302, 323, 300; 455/205, 208

[56] References Cited

U.S. PATENT DOCUMENTS 4,462,107  7/1984  Vance .
4,523,324  6/1985  Marshall .
4,628,518 12/1986  Chadwick et al. ................. 375/88
4,669,094  5/1987  Van Rumpt ........................ 375/88
4,672,636  6/1987  Marshall et al. .

FOREIGN PATENT DOCUMENTS 0046682   3/1982  European Pat. Off. .
2482804  11/1981  France .
58-19038   2/1983  Japan .
58-81363   5/1983  Japan .
60-237749 11/1985  Japan .
2076238  11/1981  United Kingdom .
2120052  11/1983  United Kingdom .
2146876   4/1985  United Kingdom .

OTHER PUBLICATIONS

"Performance of Direct Conversion PSK Receiver" by Kohji Chiba et al.; Electronics Information Communication Institution; Spring; 1987; pp. 10–110.

Primary Examiner—Stephen Chin
Assistant Examiner—T. Ghebretinsae
Attorney, Agent, or Firm—Lowe, Price, LeBlanc & Becker

[57] ABSTRACT

An FSK data receiving system is provided which is capable of constituting a direct-conversion receiver suitable for realizing an integrated circuit, is capable of decoding in a wide receiving band width, and is capable of realizing a small-sized and less-electric power consumption data receiving. An FSK-modulated local oscillator signal 3 is applied to a local oscillator 2, and there is provided a decode circuit 15 which obtains the decode signal 14 by judging whether the FSK-modulated frequency deviation of the carrier wave signal 1 is a positive deviation or a negative deviation on the basis of a comparison result of a voltage change in a frequency-voltage conversion circuit 16 for a base-band signal 8; i.e. the output signal of a frequency mixer 6. An offset amount of the local oscillator frequency is judged by a voltage judging circuit 17 to produce a control signal 18 Further, there is provided another decode circuit 22 which makes a judgement of frequency change of the base-band signal 8 and a judgement of in-phase/opposite-phase relationship from the decode signal 14 and the output of the voltage judging circuit 17 so as to obtain a decode signal 23. Moreover, there is provided a decode signal processing circuit 25 which obtains a decode signal 24 from the decode signals 14, 23 in response to the control signal 18.

50 Claims, 20 Drawing Sheets

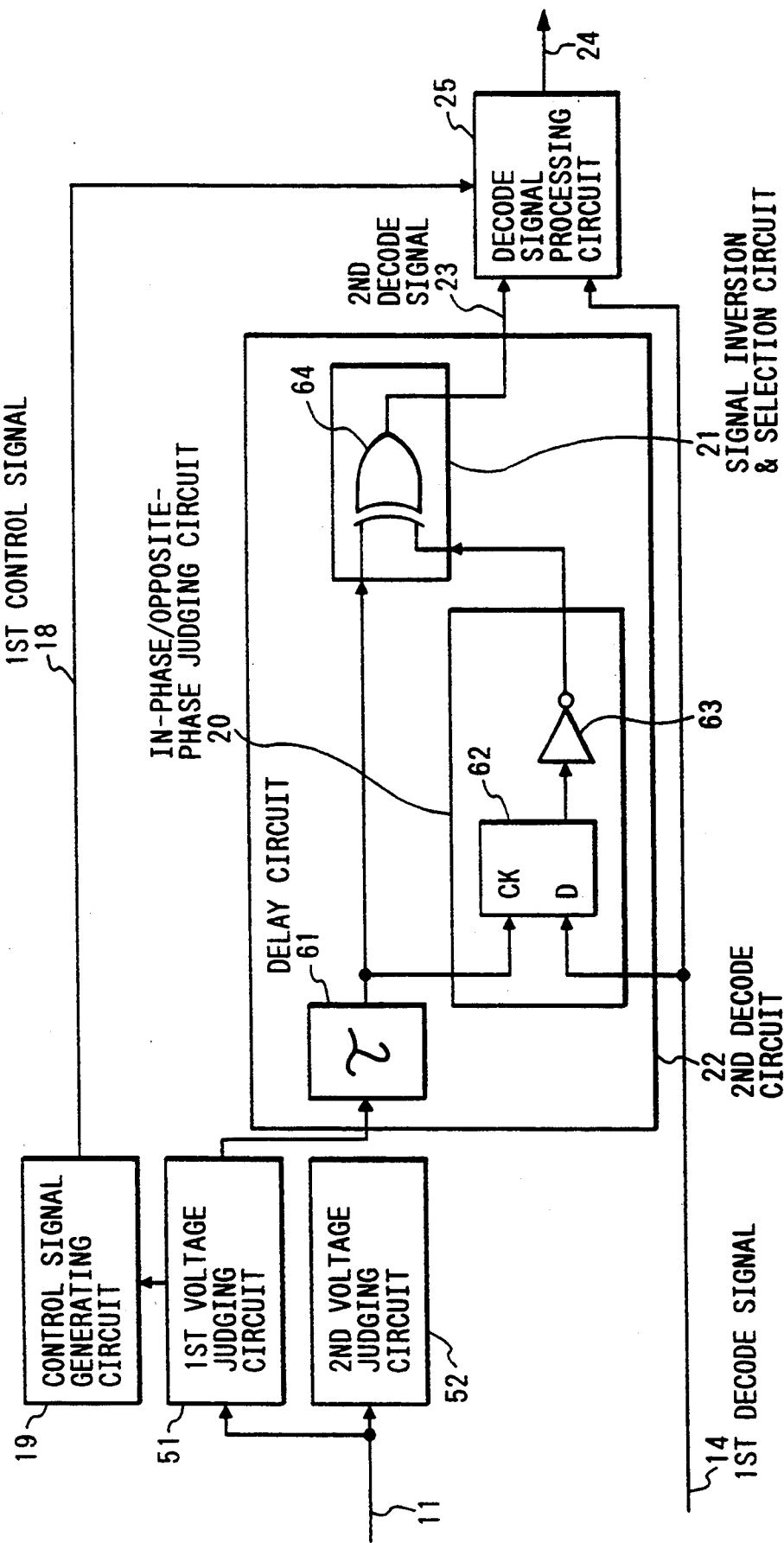

FSK DATA RECEIVING SYSTEM

BACKGROUND OF THE INVENTION

1. Field of the Invention

The present invention relates to a data receiving system for receiving frequency shift keyed (FSK) signals which are applied to a direct-conversion receiver of radiocommunication system.

2. Description of the Prior Art

Recently, a direct conversion receiver using FSK signals of a radio-frequency carrier wave has been examined if it is suitable as a receiver for realizing an integrated circuit.

For example, there is known a system disclosed in the Japanese Laid-open Patent Application No. SHO 58-81363.

Hereinafter, with reference to FIG. 19, a conventional FSK data receiving system is simply explained.

In FIG. 19, in the case where a reference symbol fc denotes a carrier wave frequency, and a reference symbol $\Delta f$ denotes an FSK-modulated frequency deviation, an antenna 121 receives an FM input signal of frequency $fc \pm \Delta f$. And then, the received signal is inputted into one input terminal of a mixer 122. An another channel signal adjacent to this desired signal is also received by the antenna 121 and sent to the mixer 122.

The other input terminal of the mixer 122 is connected to a highly-stabilized local oscillator 120 which outputs a signal having a frequency $f_L = fc - \delta f$. That is, the frequency $f_L$ is offset from the carrier wave frequency fc by a small amount ($\delta f$), though $f_L$ is within a signal channel. The output signals of the mixer 122 include signal frequencies $\Delta f + \delta f$, $\Delta f - \delta f$, and frequency-deviated adjacent channel signals.

Since the peaks between two signal frequencies $\Delta f + \delta f$ and $\Delta f - \delta f$ are spaced by an amount of $2\delta$, these signals can be separated by use of a proper discriminator. Subsequently, the adjacent channel signals are eliminated by a low-pass filter 123. The two signal frequencies are then mutually separated by bandpass filters 125 and also separated from all the low-frequency.

Output signals from respective bandpass filters 124, 125 are, in turn, inputted into their amplitude (or envelop) detectors. In order to reproduce the data signal, output signals of the amplitude detectors 126, 127 are compared in a difference circuit 128. Thus, data output can be obtain from a terminal 129.

However, in -this conventional system, since only one frequency mixer of local oscillator frequency band is used for receiving FSK data, a local oscillator frequency must be stable. For this reason, a large-size and expensive high-stable local oscillator is required, or an automatic frequency control (AFC) circuit needs to be installed on a local oscillator.

An AFC circuit requires another oscillator or a frequency mixer. Furthermore, in a quadrature demodulator circuit, two frequency mixers of local oscillator frequency band are required, Therefore this is not suitable for realizing a small-size, low power consumption, FSK data receiving system.

Though this quadrature demodulator circuit has a relatively large allowable width against a frequency offset of local oscillator, it is not still satisfactory. The conventional demodulation system was suffered from above-described problems.

Furthermore, as a conventional demodulation system, there is known, for example, a system disclosed in the Japanese Laid-open Patent Application No. SHO 58-19038. Hereinafter, with reference to FIG. 20, this conventional FSK data receiving system is simply explained.

In FIG. 20, in the case where a reference symbol fc denotes a carrier wave frequency, and a reference symbol $\delta$ denotes an FSK-modulated frequency deviation, a receiving RF signal of frequency $fc \pm \delta$ is on one hand directly applied to a first mixer circuit 181 and on the other hand applied to a second mixer circuit 182 through a phase shifter 183. The phase shifter 183 causes a 90-degree phase deviation at the carrier wave frequency Fc. A local oscillator 184 which is operated at the carrier wave frequency fc has two outputs supplied to the two mixer circuits 181 and 182, respectively.

Outputs from the two mixer circuits 181 and 182 pass low-pass filters 185, 186, respectively. Output signals from these low-pass filters 185, 186 have a frequency difference between the input signal and the local oscillator. Then, a second phase shifter 187 gives the output from the low-pass filter 186 a 90-degree phase deviation at the base-band signal frequency.

Both signals are supplied into limiting amplifiers 188 and 189, respectively. Outputs from the limiting amplifiers 188 and 189 are dealt with as digital signals and processed in the digital logic network 190. By the way, the phase shifter 183 can be disposed between the local oscillator 184 and the first mixer circuit 181 or the second mixer circuit 182, instead of the disclosed position.

However, with above constitution, if there is an offset between the local oscillator frequency and the modulated carrier wave frequency, though one base-band signal frequency is increased in accordance with frequency difference between an upper and a lower frequencies of the FSK-modulated frequency signal, the other base-band signal frequency is decreased. Therefore, a 90-degree phase shifter which usually requires a large chip and has a wide band at base-band is required for realizing an integrated circuit. Especially, error-rate of data demodulation is largely deteriorated due to the base-band signal being thus lowered. In case of high-speed data transmission, since an equivalent modulation index becomes small, its deterioration is further worsened.

Still further, there have been proposed another conventional direct-conversion receivers. FIG. 21 shows a system for demodulating from the phase relationship between two quadrature channels. (Refer to, for example, the national convention 2232 of the Electronics Information Communication Institution, spring 1987) FIG. 22 shows a system for causing a slight offset between the local oscillator signal frequency and the carrier wave signal frequency to make a demodulation based on a frequency difference of its output signal. (For example, the Japanese Laid-open Patent Application No. SHO 60-237749)

In FIG. 21, a reference numeral 101 denotes an antenna, and a reference numeral 102 denotes a low-noise amplifier circuit. Reference numerals 103, 104 are mixer circuits, and a reference numeral 105 denotes a quadrature circuit. A reference numeral 106 denotes a local oscillator, and reference numerals 107, 108 denote low-pass filters. Reference numerals 109, 110 denote limiter amplifiers, and a reference numeral 111 denotes a sign judging circuit. Furthermore, in FIG. 22, a reference numeral 112 denotes a frequency discriminating circuit, and a reference numeral 113 denotes a sign judging circuit.

In the direct-conversion receiver constituted as described above, its operation is explained hereinafter. First of all, in the quadrature demodulation system of FIG. 21, the local oscillator signal is divided into two quadrature signals in the phase shifter 105. These divided signals are mixed with the carrier wave signal in the mixer circuits 103,104. Baseband signals outputted from the mixer circuits are sent to the low-pass filters 107, 108 and the limiter amplifiers 109, 110, respectively, so as to be formed in rectangular waveforms. And the demodulation is carried out from thus obtained two signals.

Furthermore in an offset system of FIG. 22, the carrier wave signal and the local oscillator signal having a frequency being offset from the carrier wave signal frequency are mixed together to obtain a base-band signal. The waveform of the base-band signal is waveform-shaped by the low-pass filter 107 and the limiter amplifier 109. And, the demodulation is carried out by discriminating its frequency.

However, in such a conventional system, since the quadrature demodulation system requires two pairs of mixers, channel filters, and limiting amplifiers, it is disadvantageous in size and electric power consumption. On the other hand, in case of the offset demodulation system, since it requires one set of mixer, channel filter, and limiting amplifier, saving electric power consumption is possible. However, when the frequency of the local oscillator signal is equal or close to the frequency of the carrier wave, its frequency difference cannot be detected from an output baseband signal and therefore the demodulation cannot be executed.

Accordingly, the conventional systems have problems such that the local oscillator circuit is required a high frequency stability, or a means such as an automatic frequency controller is required.

SUMMARY OF THE INVENTION

The present invention has a purpose, in order to solve above-mentioned problems, to provide a low power consumption, suitable for an integrated circuit, demodulation system which can receive radio FSK data by use of only one frequency mixer of local oscillator frequency band, can execute a high-speed data transmission to a certain degree, can increase the allowance width of frequency offset between a local oscillator frequency and a carrier wave and therefore does not need an AFC circuit, and can be use even in a high-frequency band of decreased frequency stability.

In order for accomplishing above purposes, in accordance with one aspect of the present invention, a local oscillator is supplied with FSK-modulated local oscillator signals. And, in order to obtain a first decode signal, there is provided a first decode-circuit which judges whether an FSK-modulated frequency deviation of a carrier wave signal has a positive deviation or a negative deviation by comparing a voltage change in a frequency-voltage conversion circuit of base-band signals. And further, in addition to the first decode circuit, there is provided a decode signal processing circuit.

In the decode signal processing circuit, in order to generate a first and a second control signals, an offset of a local oscillator frequency is judged on the basis of an output voltage from a frequency-voltage conversion circuit. In the case where it is judged that the offset of the local oscillator frequency remains within a small value in accordance with the first control signal, the first decode signal of the first decode circuit is outputted as a third decode signal.

In the case where it is judged, on the contrary, that the offset of the local oscillator frequency is increased to a large value to a certain degree in accordance with the first control signal, the decode signal processing circuit obtains, as a second decode circuit, a second decode signal similar to said first decode signal in a higher side of the base-band frequency by judging whether the local oscillator frequency offset is a positive direction or a negative direction based on a judgement of in-phase/opposite-phase relationship between said first decode signal and the judgement signal of the base band frequency signal and, to the contrary, in a lower side of the base-band frequency, obtains the second decode signal by use of the judgement signal obtained from frequency change of the base-band frequency signal and a judgement result of said in-phase/opposite-phase relationship. Then, the third decode signal is obtained from the first and the second decode signals by said first control signal. And, by using this third decode signal, a data demodulation can be executed.

Furthermore, in a range wherein the offset of local oscillator frequency is small, it is possible to intermittently supply the means for obtaining the second decode signal with an electric power source voltage from a second electric power supply circuit in accordance with the second control signal after having obtained the first decode signal. On the other hand, in a range wherein the offset of local oscillator frequency is relatively large, it is possible to control a connection-or-disconnection of the FSK-modulated local oscillator signal and a turning on-and-off of an output voltage of a first electric power supply circuit to the means for obtaining the first decode signal after having obtained the second decode signal.

The system of the present invention includes one frequency mixer of local oscillator frequency band. In response to the local oscillator signal, the voltage changing condition in the frequency-voltage conversion circuit for the base-band signals is compared. Thus, the relationship between the FSK-modulated frequency deviation of the carrier wave signal and the FSK-modulated local oscillator signal becomes apparent. Then, the first decode signal is obtained by judging whether the FSK-modulated frequency deviation of the carrier wave signal has a positive deviation or a negative deviation.

Furthermore, the offset amount of the local oscillator frequency is judged. In the case where the local oscillator frequency has a small offset, the judgement of whether the FSK-modulated frequency deviation of the carrier wave signal has a positive deviation or a negative deviation is executed by use of the above-said one frequency mixer.

On the other hand, if the offset of the local oscillator frequency increases to a certain large value, a difference between an upper frequency and a lower frequency of the base-band signal becomes large. When a base-band frequency is higher; i.e. when an equivalent modulation index is large and therefore the judgement can be carried out firmly, the in-phase/opposite-phase relationship between the decode signal of the first decode circuit and the output signal of the judgement circuit of the base-band frequency is changed on the basis of the positive/negative direction of the local oscillator frequency offset.

Therefore, its in-phase/opposite-phase relationship is judged and the inversion/non-inversion of the signal is selected. Thus, a signal similar to the first decode signal is used as the decode output.

When the base-band frequency is lower; i.e. when the equivalent modulation index is small and therefore the judgement of whether the FSK-modulated frequency deviation of the carrier wave signal has a positive or a negative deviation can not be executed easily, the demodulation is executed by utilizing a judgement of the base-band frequency change, which is advantageous in case of a larger offset of local oscillator frequency, and an information of a positive/negative direction of the offset of local oscillator frequency.

With this arrangement, it becomes possible to obtain an FSK data receiving system capable of responding to a wide range of offset of local oscillator frequency. As a result, an application of the direct-conversion receiving system to a receiver becomes easy.

Moreover, in the case where the local oscillator frequency has a smaller offset, the decode circuit portion which is operated based on the offset of the local oscillator frequency can be intermittently actuated. On the other hand, in the case where the local oscillator frequency has a larger offset, an excessive enlargement of the base-band & filter band width can be avoided by controlling the FSK-modulated local oscillator signal and the turning on-and-off of the electric power of the circuit for obtaining the first decode signal.

Furthermore, the present invention has a purpose, in order to solve above-mentioned problems, to provide a low power consumption, suitable for an integrated circuit, demodulation system which can execute a high-speed data transmission, can increase an allowance width of frequency offset between a local oscillator frequency and a carrier wave, and can be used even in a high-frequency band of decreased frequency stability.

To accomplish this end, an another aspect of the present invention provides a frequency-voltage conversion circuit for judging whether the base-band signal has a high frequency or a low frequency. From its output voltage, the local oscillator frequency offset is judged and a first and a second control signals are generated.

In the case where it is judged that the frequency offset of the local oscillator remains within a small value in accordance with the first control signal, outputted as a third decode signal is the first decode signal of the first decode circuit which judges positive/negative of the modulated frequency signal on the basis of mutual phase relationship between two base-band signals, for example, in a quadrature demodulator.

In the case where it is judged, on the contrary, that the frequency offset of the local oscillator is increased to a large value-to a certain degree in accordance with the first control signal, the decode signal processing circuit obtains, as a second decode circuit, a second decode signal similar to said first decode signal in a higher side of the base-band frequency by judging whether the local oscillator frequency offset is a positive direction or a negative direction based on a judgement of in-phase/opposite-phase relationship between said first decode signal and the judgement signal of the base band frequency signal and, to the contrary, in a lower side of the base-band frequency, obtains the second decode signal by use of the judgement signal obtained from frequency change of the base-band frequency signal and a judgement result of said in-phase/opposite-phase relationship. Then, the third decode signal is obtained from the first and the second decode signals by said first control signal. And, by using this third decode signal, a data demodulation can be executed.

Furthermore, in a range wherein the offset of local oscillator frequency is small, it is possible to intermittently supply the means for obtaining the second decode signal with an electric power source voltage from a second electric power supply circuit in accordance with the second control signal after having obtained the first decode signal. On the other hand, in a range wherein the offset of local oscillator frequency is relatively large, it is possible to control a turning on-and-off of an output voltage of a first electric power supply circuit to the means for obtaining the first decode signal after having obtained the second decode signal.

With above-described constitution, an offset amount of the local oscillator is judged. In the case where the local oscillator frequency has a small offset, the judgement of whether the FSK-modulated frequency signal has a positive deviation or a negative deviation is executed by use of a circuit constitution for demodulating based on mutual phase relationship between base-band signals of, for example, a quadrature demodulator.

On the other hand, if the offset of the local oscillator frequency increases to a certain large value, a difference between an upper frequency and a lower frequency of the baseband signal becomes large in accordance with the deviation of the FSK-modulated frequency signal. The judgement of whether the FSK-modulated frequency signal has a positive deviation or a negative deviation cannot be executed by merely utilizing its difference. When a base-band frequency is higher; i.e. when an equivalent modulation index is large, the judgement of in-phase/opposite-phase relationship between the decode signal by the quadrature demodulator etc. and the output signal from the judgement circuit of the base-band frequency is done in order to judge the positive/negative direction of the local oscillator frequency offset. And, a signal similar to the output signal by the quadrature demodulator is used as the decode output.

When the base-band frequency is lower; i.e. when the equivalent modulation index is small and therefore the judgement of whether the FSK-modulated frequency signal has a positive or a negative deviation can not be executed easily, the demodulation is executed by utilizing a judgement of the base-band frequency change, which is advantageous in case of a larger offset of local oscillator frequency, and an information of a positive/negative direction of the offset of local oscillator frequency by the in-phase/opposite phase judgement.

With this arrangement, it becomes possible to obtain an FSK demodulation system capable of responding to a wide range of offset of local oscillator frequency. As a result, an application of the direct-conversion receiving system to a receiver becomes easy.

Moreover, in the case where the local oscillator frequency has a smaller offset, the decode circuit portion which is operated based on the offset of the local oscillator frequency can be intermittently actuated. On the other hand, in the case where the local oscillator frequency has a larger offset, an electric power saving can be realized by controlling the turning on-and-off of the electric power of the conventional demodulation circuit constitution.

Yet further, in order to realize above purposes, another aspect of the present invention provides an FSK data receiving apparatus which produces a base-band signal by directly converting a frequency signal modulated with deviation $\pm \Delta f_1$ with respect to the carrier wave signal and a local oscillator signal having substantially the same frequency as the carrier wave signal into the base-band signal by use of a frequency mixer. The system comprises a means for modulating a frequency of the local oscillator signal with a frequency deviation of $\pm \Delta f_2$ by giving a 90-degree phase difference at the same transmission speed as the frequency deviation of said carrier wave or by phase-locking at a twice as large transmission speed as the frequency deviation of said carrier wave; a means for shaping a waveform of the base-band signal into a rectangular wave form; a means for detecting a building-up and a trailing-edge of said rectangular wave to discriminate an edge interval, and generating a voltage or a numerical value in accordance with its edge interval; a means for outputting a maximum value of said voltage or the numerical value during a time period corresponding to ½ data symbol with respect to the transmission speed of the frequency deviation of the carrier wave signal; a means for discriminating the frequency of said base-band signal on the basis of its maximum value; and a means for executing a sign judgement from an interrelation between positive/negative sign of the frequency deviation of the local oscillator signal and the frequency of the base-band signal.

Furthermore, as the means for discriminating said edge interval, there is provided a means which generates a sawtooth waveform by carrying out an integration during a time period between the building-up and the trailing-edge of the base-band signal being shaped in a rectangular waveform and obtains a voltage in accordance with a period of said base-band signal, or a means which counts other high-speed pulses during a time period between the building-up and the trailing-edge of the base-band signal and obtains a signal in accordance with a period of said base-band signal.

By utilizing a clock of a CPU controlling an operation of the FSK data receiving machine as a signal source of said high-speed pulse, the high-speed pulse signal source can be commonly used. Furthermore, there is provided a means for counting said high-speed pulses by a number corresponding to ½ data symbol with respect to the data transmission clock of the carrier wave signal, so that the local oscillator circuit can be FSK-modulated to have a 90-degree phase difference at the same speed as the transmission speed of said carrier wave signal or to be phase-locked at a twice as large transmission speed as said carrier wave signal.

Moreover, there is provided a means for detecting the offset causing between the local oscillator signal and the carrier wave signal on the basis of the value which is frequency-discriminated. And there is provided a means which executes a demodulation by deactivating the modulation of the local oscillator and discriminating only the frequency change of the output base-band signal.

In accordance with the present invention constituted as above described, an FSK-demodulated data can be demodulated with a simple constitution such as one set of a mixer, a channel filter, and a limiter amplifier. In the case where the carrier frequency and the local oscillator frequency are equal with each other, an FSK-modulation against the local oscillator signal becomes equivalent to offsetting the local oscillator frequency against the carrier wave signal frequency by an amount of frequency deviation.

In this case, the frequency of the base-band signal is increased or decreased in accordance with a positive frequency deviation or a negative frequency deviation of the carrier wave signal. Furthermore, this high/low relationship of the base-band signal frequency is inverted by positive/negative sign of the frequency deviation of the local oscillator signal. Accordingly, by discriminating the positive/negative sign of the frequency deviation of the local oscillator signal and the frequency of the base-band signal, the sign judgement of data can be carried out based on its interrelation.

Furthermore, during the edge interval between the building-up and the trailing-edge of the rectangular wave being shaped in a rectangular waveform in discriminating the frequency of the base-band signal, a voltage or a numerical value can be obtained in accordance with the period of the base-band signal by the integration circuit or by counting the high-speed pulses.

Moreover, in transmitting the high-speed data, a cycle number of the base-band signal included in one data symbol becomes small. Therefore, by FSK-modulating the local oscillator signal to have the same transmission speed as the FSK-modulated frequency deviation of the carrier wave signal with a 90-degree phase difference or to be phase-locked at a twice large transmission speed as the FSK-modulated frequency deviation of the carrier wave signal, the positive/negative sign of the frequency deviation of the local oscillator signal can be switched once during one data symbol.

Still further, in the case where the local oscillator frequency is offset largely from the carrier wave frequency, since the modulation of the local oscillator signal is stopped, it becomes possible to prevent an occupied bandwidth from increasing.

The above and other objects, features and advantages of the present invention will become more apparent from the following detailed description which is to be read in conjunction with the accompanying drawings.

BRIEF DESCRIPTION OF THE DRAWINGS

FIGS. 6(a)–(b) an circuit system diagram of a second decode circuit including its vicinity including a second decode circuit in accordance with a fifth embodiment of the present invention;

DETAIL DESCRIPTION OF THE PREFERRED EMBODIMENTS

Hereinafter, referring now to the accompanying drawings, embodiments of the present invention are explained in detail.

FIRST EMBODIMENT

Hereinafter, referring now to FIG. 1, a first embodiment of the present invention is explained in detail.

Figure 1:
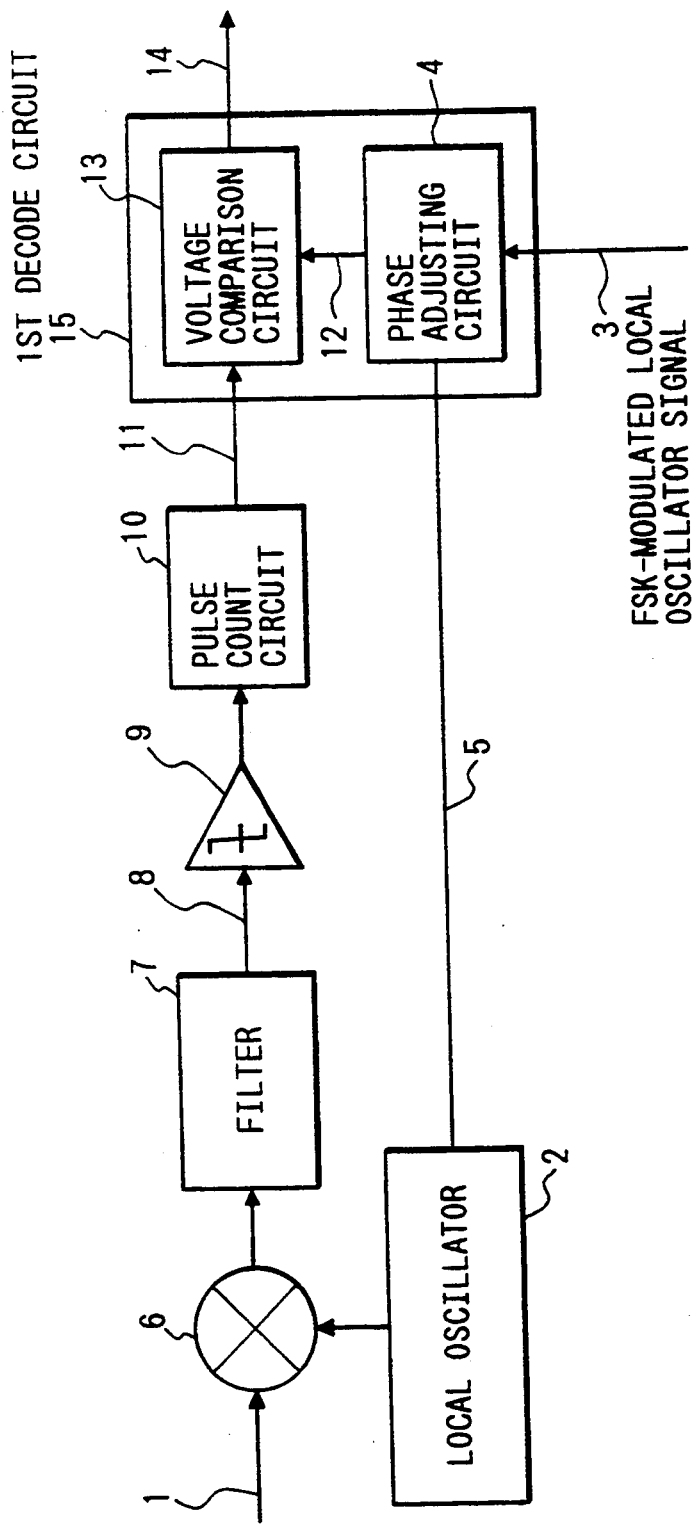
FIG. 1 is a circuit system diagram showing a main portion of a receiver embodying an FSK data receiving system in accordance with a first embodiment of the present invention.

FIG. 1 is a circuit system diagram showing a main portion of a receiver embodying an FSK data receiving system in accordance with the present invention. In FIG. 1, the system comprises a local oscillator 2 causes oscillation with substantially the same frequency as a carrier wave signal 1 which is FSK-modulated with upper and lower equi-frequency deviations, and a phase adjusting circuit 4 for adjusting the phase of the FSK-modulated local oscillator signal 3.

A first output signal 5 of the phase adjusting circuit 4 is added to the local oscillator 2. An output signal of the local oscillator 2 and the carrier wave signal 1 are mixed together in a frequency mixer 6. An output signal of the frequency mixer 6 is fed to a filter 7 to obtain a base-band signal 8. The base-band signal 8 is suppressed its amplitude by an amplitude limiting amplifier 9. A pulse number of its output is converted into a form of a voltage in a pulse count circuit 10.

That is, the amplitude limiting amplifier 9 and the pulse count circuit 10 constitute a frequency-voltage conversion circuit 16. An output voltage 11 of the pulse count circuit 10 and a second output signal 12 of the phase adjusting circuit 4 which adjusts the phase of the FSK-modulated local oscillator signal 3 are compared with each other in a voltage comparison circuit 13. The voltage comparison circuit 13 outputs a first decode signal 14. That is, the voltage comparison circuit 13 and the phase adjusting circuit 4 constitute a first decode circuit 15. Thus, a data demodulation is carried out on the basis of its first decode signal 14.

With this arrangement, its operation is explained hereinafter. The local oscillator 2 for causing oscillator with substantially the same frequency as the carrier wave signal 1, being FSK-modulated with upper and lower equi-frequency deviations, is added to the first output signal 5 which is obtained by adjusting the FSK-modulated local oscillator signal 3 in the phase adjusting circuit 4. The output signal of the local oscillator 2 and the carrier wave signal 1 are supplied to the frequency mixer 6. And, its output is changed into the base-band signal 8 by filtered it in the filter 7.

If supposed that a frequency offset of the local oscillator 2 is $\Delta f$, FSK-modulated frequency deviations of the carrier wave signal 1 are $\pm f_D$, and frequency deviations of the FSK-modulated local oscillator signal 3 are $\pm f_L$.

| | $f_D$ | $f_L$ |
|---|---|---|
| $B(t) = \cos(2\pi(f_D - f_L - \Delta f)t - \theta)$ | + | + |
| $B(t) = \cos(2\pi(f_D + f_L - \Delta f)t - \theta)$ | + | − |
| $B(t) = \cos(2\pi(f_D + f_L + \Delta f)t + \theta)$ | − | + |
| $B(t) = \cos(2\pi(f_D - f_L + \Delta f)t + \theta)$ | − | − |

Figure 9:
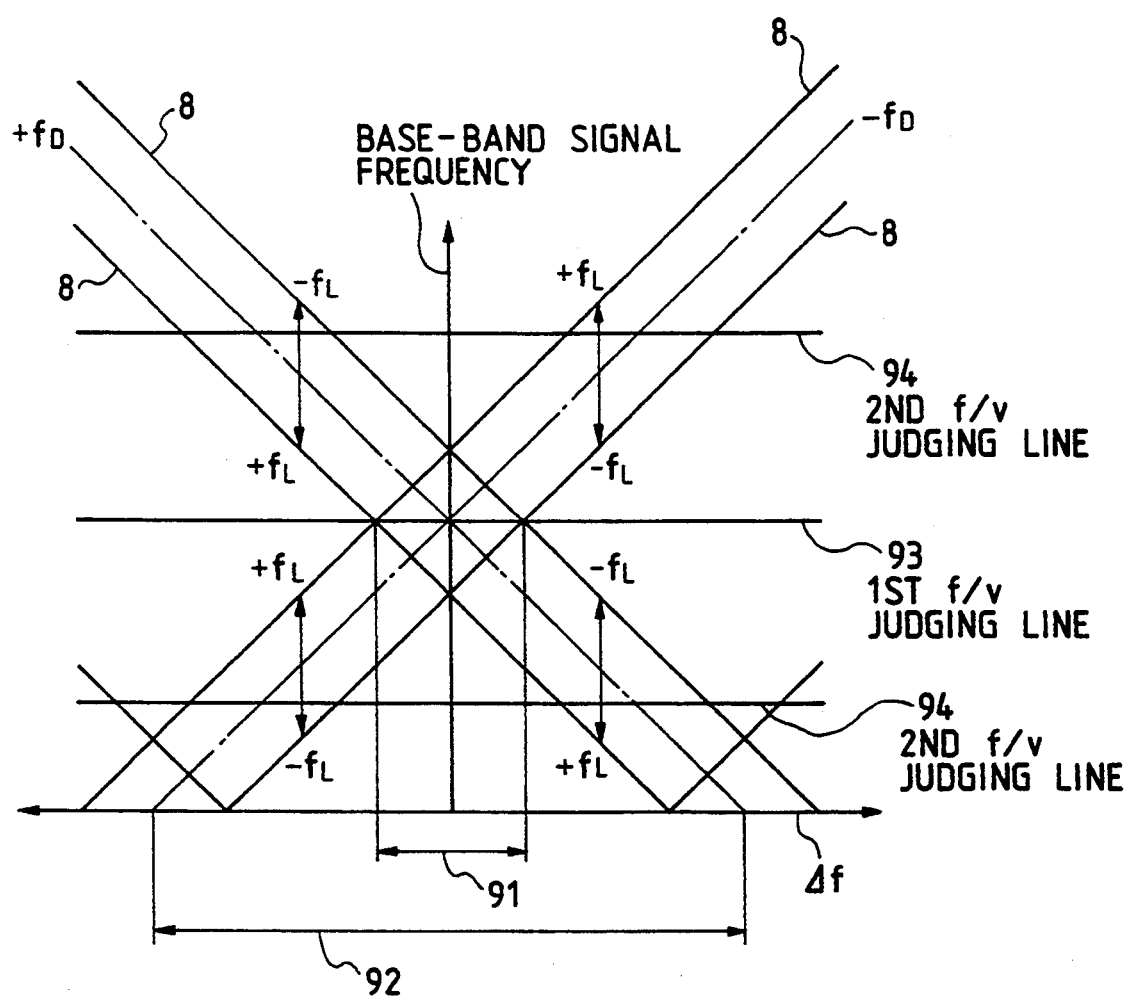
FIG. 9 is a schematic view showing setting operation points of a voltage judging means in the third to the ninth embodiments of the present invention.
Figure 10:
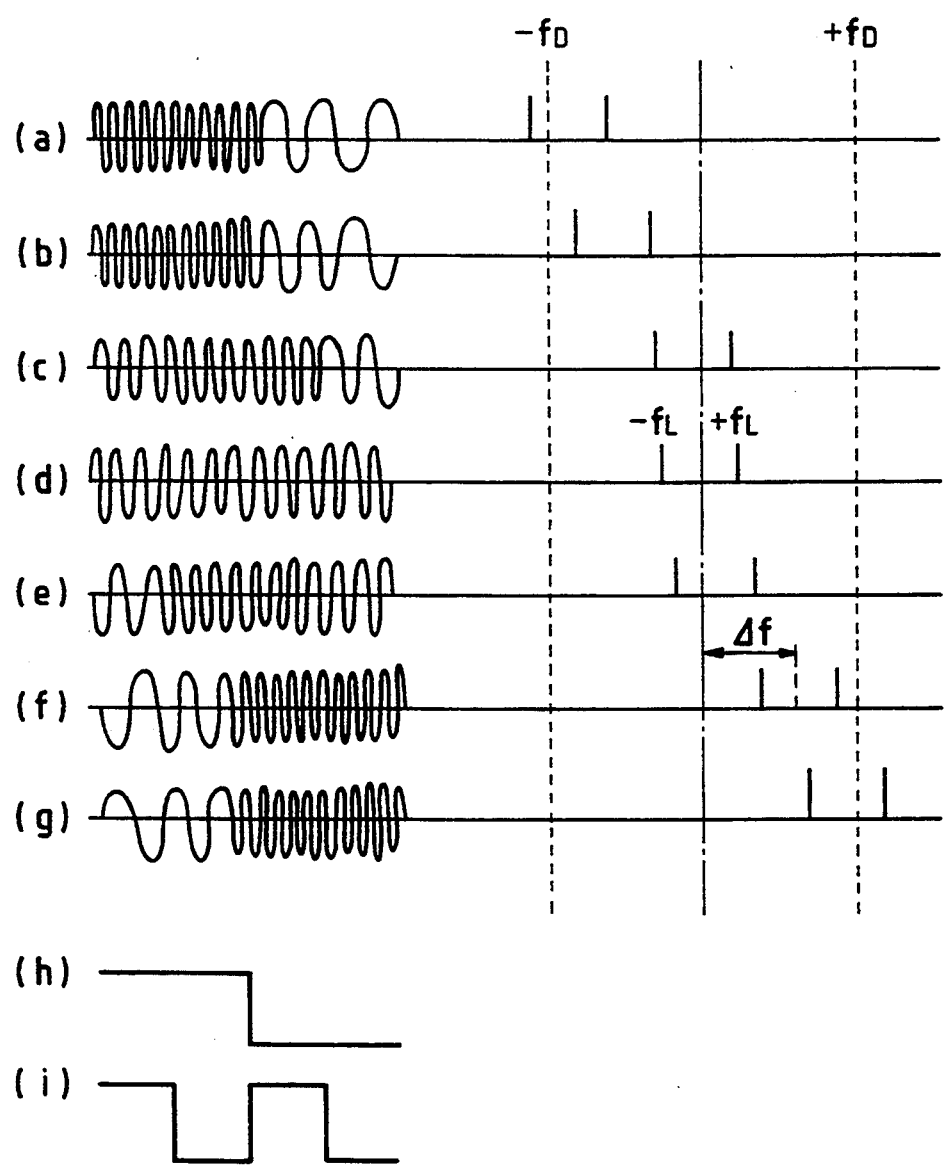
FIGS. 10(a–i) is a view showing waveforms of respective frequency signals in the third to the ninth embodiments of the present invention.

The relationship of these frequency functions are expressed by 4 base-band signals 8 with respect to the value of $\Delta f$ as shown in FIG. 9. Furthermore, as illustrated in FIG. 10, from the relationship between an FSK-modulated frequency deviation signal (h) of the carrier wave 1 and an FSK-modulated local oscillator signal 3 (i), an output frequency of its base-band signal 8 is determined based on the mutual relationship of $f_D$ and $f_L$ in accordance with the frequency offset $\Delta f$ of the local oscillator.

Thus obtained base-band signal is suppressed its amplitude by the frequency amplitude limiting amplifier 9. And the pulse number of its output pulses is converted into a form of voltage by the pulse count circuit 10. By judging its voltage, it becomes possible to judge the frequency change of the base-band signal 8.

Accordingly, the comparison between the output voltage 11 of the pulse count circuit 10 and the second output signal 12 from the FSK-modulated local oscillator signal 3 is carried out in the voltage comparison circuit 13 in synchronization with the phase adjustment of the FSK-modulated signal 3 by the phase adjusting circuit 4, so as to realize the decoding.

As is described above, since the decode signal is obtained from the phase adjusting circuit 4 and the voltage comparison circuit 13, these two circuits are called as a first decode circuit 15. The data demodulation is carried out by using the first decode signal 14 which is an output signal of the first decode circuit 15.

Figure 3:
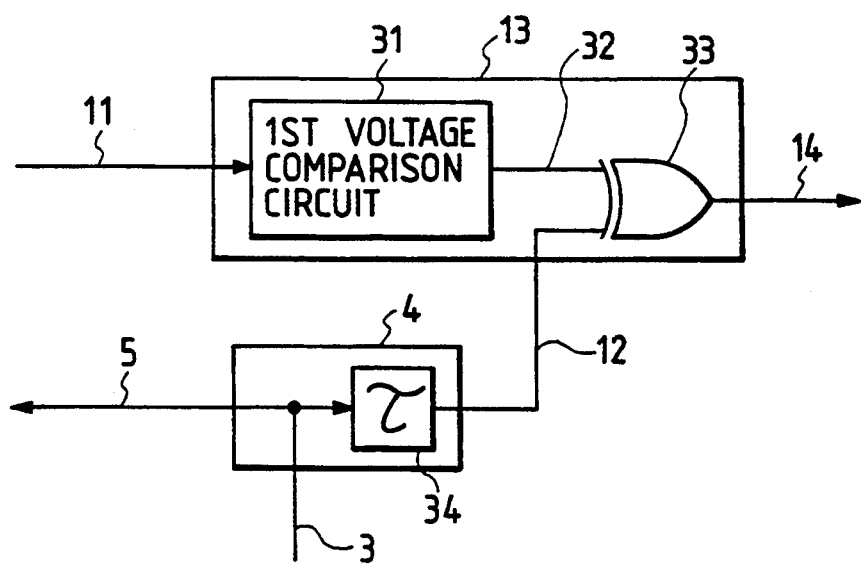
FIG. 3 is a circuit system diagram showing one embodiment of a detail decode circuit adopted in the receiver embodying an FSK data receiving system in accordance with the first embodiment of the present invention.

FIG. 3 is a view showing a specific circuit of the first decode circuit 15 of the first embodiment in accordance with the present invention. FIG. 3 is a circuit capable of decoding the frequency offset $\Delta f$ of the local oscillator 2 within a range 91 of frequency deviations $\pm f_L$ of the FSK-modulated local oscillator signal 3, as illustrated in FIG. 9.

The voltage comparison circuit 13 of the first decode circuit 15 includes a first voltage comparison circuit 31 for comparing the voltages on the basis of a voltage corresponding to a frequency pulse number of an FSK-modulated frequency deviation of the carrier wave signal 1 such as a first f/V judging line 93 shown in FIG. 9, and a first exclusive-OR circuit 33 for inputting an output signal 32 of the first voltage comparison circuit 31 and the second output signal 12 of the phase adjusting circuit 4. The FSK-modulated local oscillator signal 3 is directly used as the first output signal 5 of the phase adjusting circuit 4, and the FSK-modulated local oscillator signal 3 is on the other hand delayed in a delay circuit 34 so as to be used as the second output signal 12 of the phase adjusting circuit 4.

Hereinafter, referring to FIGS. 9, 10, and 11, an operation of the embodiment of FIG. 3 is explained. In the range 91 wherein the frequency offset $\Delta f$ of the local oscillator 2 is within the frequency deviations $\pm f_L$ of the FSK-modulated local oscillator signal 3 as explained in FIG. 9, the FSK-modulated frequency deviation signal of the carrier wave 1 is changed to increase and decrease as shown by "a" in FIG. 11 based on the frequency deviations $\pm f_D$.

Furthermore, when the frequency deviations $\pm f_L$ of the FSK-modulated local oscillator signal 3 are changed, the input signal 5 to the local oscillator 2; i.e. the phase-adjusted signal in the phase adjusting circuit 4, is changed to increase and decrease as shown by "b". The base-band signal 8 obtained by filtering a signal obtained as an output signal from the frequency mixer 6 in the filter 7 is amplified to limit its amplitude in the amplitude limiting amplifier 9.

An output voltage 11 of the pulse count circuit 10 which corresponds to the frequency of the base-band signal becomes as follows.

That is, in case of $+f_D$, if the frequency deviation is $+f_L$, the output voltage 11 becomes lower than a frequency deviation $f_D$ of a first f/V judging line 93 in the first voltage comparison circuit 31 shown in FIG. 9. On the other hand, if the frequency deviation is $-f_L$, the output voltage 11 becomes higher than the $f_D$ of the first f/V judging line 93. Furthermore, in case of $-f_D$, if the frequency deviation is $+f_L$, the output voltage 11 becomes higher than the frequency deviation $f_D$ of the first f/V judging line 93. On the other hand, if the frequency deviation is $-f_L$, the output voltage 11 becomes lower than the $f_D$ of the first f/V judging line 93. This can be easily understood as frequency difference between respective signals from FIGS. 10(c), 10(d), and 10(e).

Figure 11:
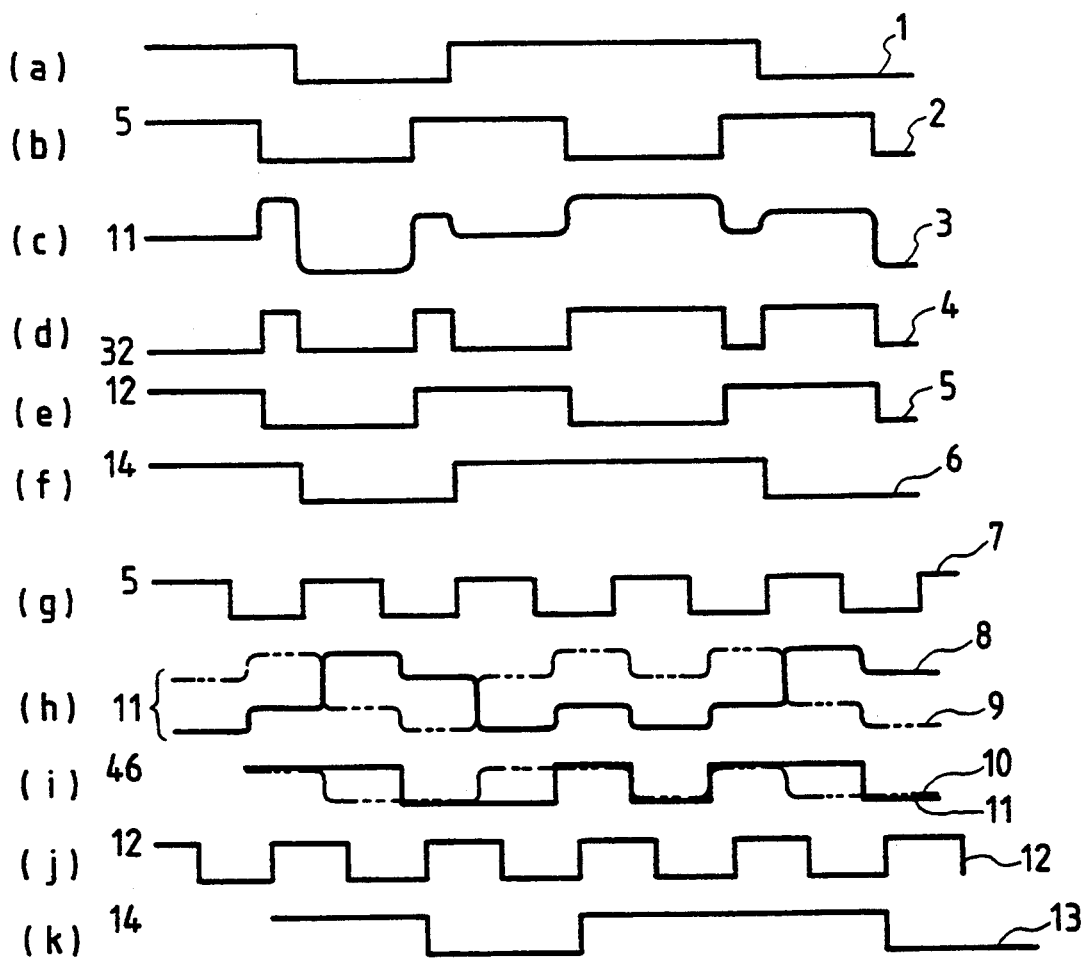
FIGS. 11(a–k) is a view showing waveforms of respective frequency signals in the fourth and fifth embodiments of the present invention.

For example, in the case where the local oscillator frequency has a slight negative offset as shown in FIG. 10(c), the output voltage 11 becomes "c" of FIG. 11 in accordance with the frequency difference between respective signals. After the output voltage 11 has been judged by the first f/V judging line 93 in the first voltage comparison circuit 31, its output signal 32 becomes "d" of FIG. 11 irrespective of positive/negative direction of the offset of local oscillator frequency.

The FSK-modulated oscillator frequency signal 3 is delayed in the delay circuit 34 as shown by "e" of FIG. 11 in order to compensate a time phase difference between the FSK-modulated local oscillator signal 3 and the base-band signal 8 whose frequency is converted into a form of a voltage. By being thus adjusted the timing, the output signal 32 of the first voltage comparison circuit 31 and the output signal 12 of the delay circuit 34 are supplied to an exclusive-OR circuit 33. Then, an output of the exclusive-OR circuit 33; i.e. the first decode signal 14 is obtained as shown by "f" in FIG. 11, which corresponds to a delayed signal of the FSK-modulated frequency deviation signal 3.

As is apparent from the foregoing explanation, in accordance with this embodiment, only one frequency mixer of local oscillator frequency band is adopted. And further, by supplying the FSK-modulated local oscillator signal to the local oscillator, and comparing the voltage change in the frequency-voltage conversion circuit for the base-band signal, it is judged whether the FSK-modulated frequency deviation of the carrier wave signal is a positive deviation or a negative deviation, so as to obtain the decode signal.

Therefore, the number of the frequency mixer of local oscillator frequency band which consumes significant electric power can be decreased by one than usual. Furthermore, since it is not necessary to distribute the output of the local oscillator to two frequency mixers, an output of the local oscillator can be lowered within a small value. Thus, mutual interference causing a problem in a direct-conversion receiver can be suppressed, and it becomes possible to minimize the size and save power consumption.

Moreover, in accordance with the embodiment disclosing the specific constitution of the first decode circuit, it becomes possible to decode the data by use of a simple decode circuit, though its application field is narrow. Thus, a small-size, low-power consumption, FSK data receiving system is obtained.

SECOND EMBODIMENT

Figure 4:
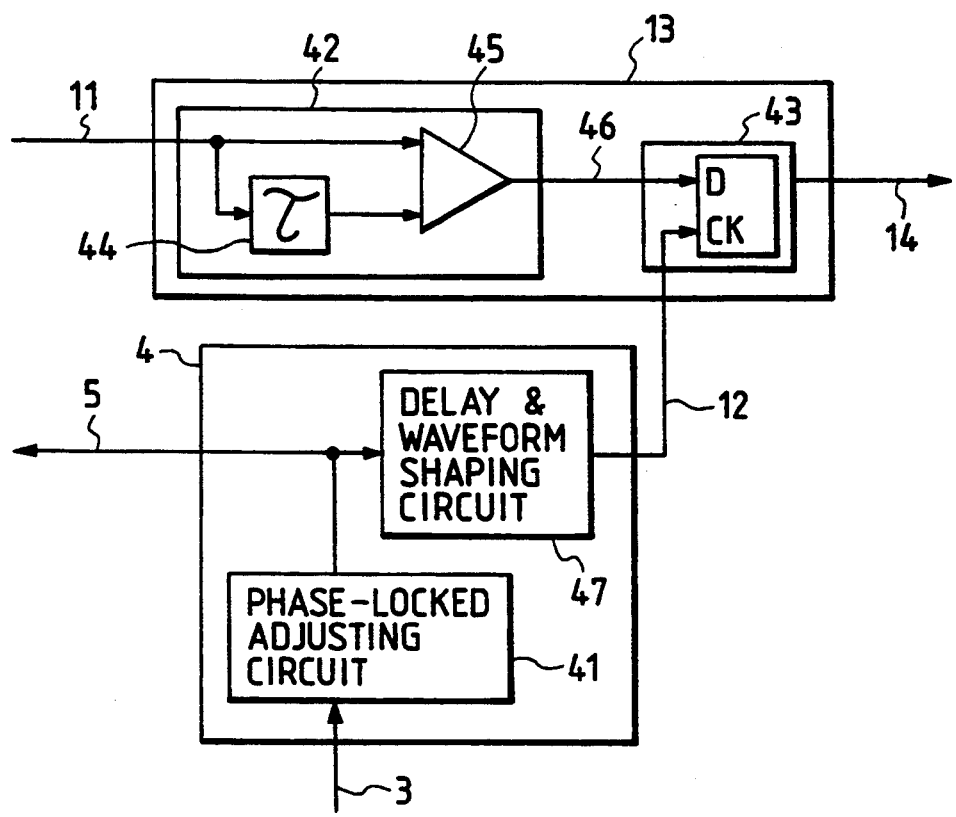
FIG. 4 is a circuit system diagram showing one embodiment of a detail decode circuit adopted in the receiver embodying an FSK data receiving system in accordance with the second embodiment of the present invention.

Hereinafter, referring to FIGS. 1 and 4, a second embodiment of the present invention is explained. FIG. 4 is a view showing one embodiment of a specific circuit of the first decode circuit 15 for a receiver embodying the FSK data receiving system in accordance with the present invention.

The first decode circuit 15 of FIG. 4 is a circuit capable of decoding the frequency offset $\Delta f$ of the local oscillator 2 within a range 92 of the FSK-modulated frequency deviations $\pm f_D$ of the carrier wave signal 1 as shown in FIG. 9. In this case, there is provided a phase-locked adjusting circuit 41 for supplying the FSK-modulated local oscillator signal 3 to the local oscillator 2. Furthermore, though it become necessary to provide a circuit for judging increase/decrease of the frequency pulses in a unit data section for signal transmission of the FSK-modulated frequency deviation of the carrier wave signal 1, there are further provided a delay & voltage comparison circuit 42 and a D-type flip-flop circuit 43 as its specific circuit.

Hereinafter, with reference to FIGS. 9, 10, and 11, an operation of the embodiment shown in FIG. 4 is explained. In the range 92 wherein the frequency offset $\Delta f$ of the local oscillator 2 is within the FSK-modulated frequency deviations $\pm f_D$ of the carrier wave signal 1 as illustrated in FIG. 9, the FSK-modulated frequency deviation signal of the carrier wave 1 is changed to increase and decrease as shown by "a" in FIG. 11 based on the frequency deviations $\pm f_D$.

If the input signal 5 to the local oscillator 2 is adjusted by the phase-locked adjusting circuit 41 in such a manner that the frequency deviations $\pm f_L$ of the FSK-modulated local oscillator signal 3 have the same transmission speed and a 90-degree phase difference with respect to the FSK-modulated frequency deviations $\pm f_D$ of the carrier wave signal 1 or are phase-locked with two-times transmission speed as shown by "g" in FIG. 11, the output voltage 11 of the pulse count circuit 10 is changed as shown in "h" of FIG. 11 since the frequency of the base-band signal 8 is changed to increase or decrease 15 within a unit data section of the transmission signal of the FSK-modulated frequency deviation of the carrier wave signal 1. In FIG. 11(h), a broken line corresponds to the local oscillator frequency offset of FIG. 10(b) and a solid line corresponds to the local oscillator frequency offset of FIG. 10(f).

The order of frequency increase/decrease of the base-band signal 8 within the unit data section is reversed in accordance with data of FSK-modulated frequency deviation signal of the carrier wave signal 1; i.e. in accordance with the polarity of the frequency deviation $\pm f_D$, as can be understood from FIGS. 9 and 10, irrespective of the offset amount of the local oscillator frequency.

Accordingly, the delay & voltage comparison circuit 42 and the D-type flip-flop circuit 43 are provided as a circuit for judging the increase/decrease in the unit data section. The delay & voltage comparison circuit 42 includes a voltage comparator which compares a present signal value and a signal value delayed in the delay circuit 44 by an amount of a half time of the unit data section. Therefore, there is generated a delay more than approximately half time of the unit data section in order to obtain a judgement result. Its output signal 46 becomes as shown by a solid line or a broken line shown by "i" of FIG. 11 so as to correspond to the solid line or the broken line shown by "h" of FIG. 11.

In this case, a section in which both the solid line and the broken line show the same judgement result is a second-half of the unit data section, and is corresponding to a portion wherein the increase/decrease in the unit data section is already judged.

On the other hand, a first-half portion of the unit data section corresponds to a portion wherein the judgement is changed based on a relationship to the previous data section or the offset of local oscillator frequency. Since it is sufficient for the judgement to use only the increase/decrease in the unit data section, the output signal of the phase-locked adjusting circuit 41 is delayed by the delay & waveform shaping circuit 47 so that a pulse builds up in the section. Thus, the output signal 12 becomes as shown by "j" of FIG. 11.

This output signal 12 is inputted to the D-type flip-flop circuit 43 as a clock input. The output signal 46 of the delay & voltage comparison circuit 42 is inputted to the D-type flip-flop circuit 43 as a D-input. By being compared in the D-type flip-flop circuit 43, an output signal is obtained as shown by "k" of FIG. 11, which is the first decode signal 14 obtained by delaying the FSK-modulated frequency deviation signal of the carrier wave shown by "a" in FIG. 11.

Almost the same thing is said in the case where the transmission speed of the FSK-modulated local oscillator signal 3 is the same as the transmission speed of the FSK-modulated frequency deviation signal of the carrier wave signal 1 and has a 90-degree phase difference. However, in this case in order for adjusting with the increase/decrease judging portion of the unit data section, it becomes necessary to make a narrow-width pulse by detecting both edges of pulse and input it to the D-type flip-flop circuit 43 as a clock input, in addition to the delayed signal from the delay and waveform shaping circuit 47.

As is apparent from the foregoing explanation, in accordance with this embodiment, only one frequency mixer of local oscillator frequency band is adopted as well as the first embodiment. And the decode signal can be obtained by judging whether the FSK-modulated frequency deviation of the carrier wave signal is a positive deviation or a negative deviation. Thus, it becomes possible to realize a small-size, low-power consumption system. Furthermore, in accordance with the embodiment disclosing the specific circuit of the first decode circuit, an applicable range of frequency offset of the local oscillator can be enlarged to the maximum range required as the direct-conversion receiver; i.e. the FSK-modulated frequency deviation of the carrier signal.

THIRD EMBODIMENT

Figure 2:
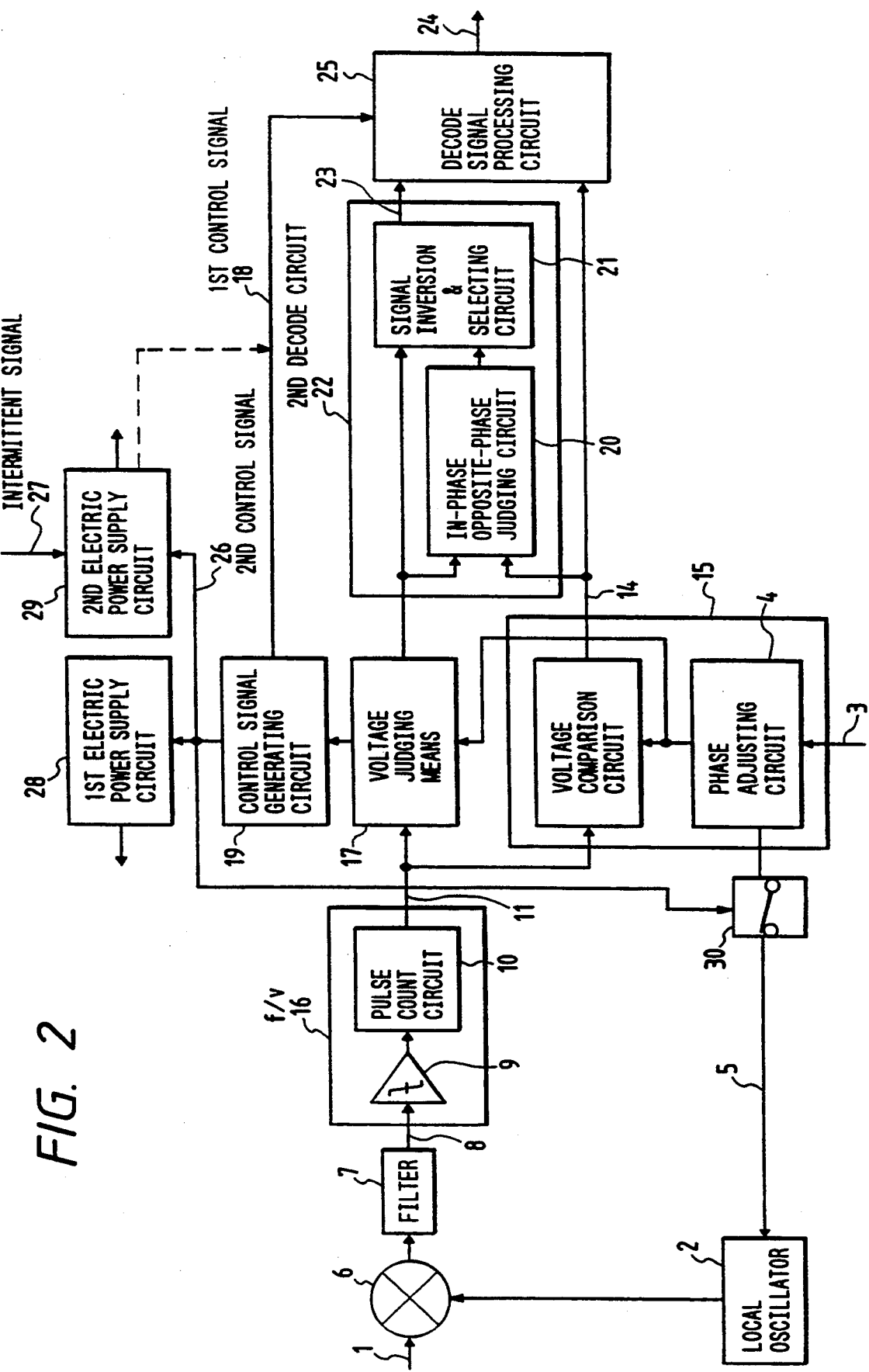
FIG. 2 is a circuit system diagram showing a main portion of a receiver embodying an FSK data receiving system in accordance with a third embodiment of the present invention.

Next, with reference to FIG. 2, a third embodiment of the present invention is explained. FIG. 2 is a circuit system diagram showing a main portion of a receiver embodying an FSK data receiving system in accordance with the present invention. In FIG. 2, by comparing the voltage change in the frequency-voltage conversion circuit 16 for the base-band signal 8, it is judged whether the FSK-modulated frequency deviation of the carrier wave 1 is a positive deviation or a negative deviation, so as to output the first decode signal 14.

In addition to the first decode circuit 15 of the first and the second embodiments, there is provided a voltage judging means 17 which has an input voltage of the output from the frequency-voltage conversion circuit 16 for the base-band signal 8. And further there is provided a control signal generating circuit 19 for obtaining the first control signal 18 based on the signal fed from the voltage judging means 17. Moreover, there is provided a second decode circuit 22 which includes an in-phase/opposite-phase judging circuit 20 for judging whether the first decode signal 14 and the output signal of the voltage judging means 17 are in-phase or opposite-phase on the basis of the output signal of the voltage judging means 17 and a signal inversion & selection circuit 21 for selecting either of the output of the voltage judging means 17 and its inversion signal in accordance with the output signal of the in-phase/opposite-phase judging circuit 20. Thus, the second decode signal 23 is obtained as an output signal of the signal inversion & selection circuit 21; i.e. as an output signal of the decode circuit 22.

Furthermore, in addition to the first control signal 18 outputted the control signal generating circuit 19, there are included an intermittent operation control signal 27, a first and a second electric power supply circuits 28, 29, and a switching circuit 30 for connecting or disconnecting the FSK-modulated local oscillator signal. Still further, there is provided a decode signal processing circuit 25 for inputting the first and the second decode signals 14, 23 and obtaining the third signal 24 in response to the first control signal 18. And then, the data demodulation is executed by use of the third decode signal 24.

With above arrangement, its operation is explained hereinafter. If a transmission bit rate is speeded up with respect to the FSK-modulated frequency deviation of the carrier wave signal, the frequency components of the FSK-modulated frequency deviation included in one bit transmission are decreased. Therefore, a modulation index defined in the following equation becomes small.

Modulation index=(Maximum frequency deviation)/(Maximum signal transmission frequency)

By the way, the maximum signal transmission frequency is equal to a half of the transmission-bit-rate in case of FSK, and is equal to a half of the transmission-symbol-rate in case of multi-value FSK. In the case where the modulation index is small, the data judgement must be carried out by use of decreased frequency components. Accordingly, it is disadvantageous in the data demodulation.

Furthermore, in case of a direct-conversion receiving system, if the equivalent modulation index is expressed as follows;

Equivalent modulation index = (Base-band signal frequency)/

(Maximum signal transmission frequency) = (Modulation index) ± (Local oscillator frequency offset/Maximum signal transmission frequency), in the case where the local oscillator frequency is offset, the base-band signal frequency is increased or decreased in response to the positive or negative frequency deviation of the FSK-modulated data and, thus, the equivalent modulation index takes a large or a small value.

Especially, when the base-band signal frequency is low, the frequency components of the base-band signal is decreased and the equivalent modulation index which shows frequency components of the base-band signal included in one-bit-transmission becomes small. Therefore, it is disadvantageous for executing the data demodulation properly.

Accordingly, in addition to the first decode circuit 15 which outputs the first decode signal 14 obtained by judging whether the FSK-modulated frequency deviation of the carrier wave signal 1 is a positive deviation or a negative deviation on the basis of the comparison of voltage change in the frequency-voltage conversion circuit 16 for the base-band signal 8, there are provided the frequency-voltage conversion circuit 16 for converting the frequency of base-band signal 8 into a form of voltage and the voltage judging means 17 for inputting the output of the frequency-voltage conversion circuit 16. And further, there is provided the control signal generating circuit 19 which judges the offset of local oscillator frequency based on an output signal of the voltage judging means 17 to obtain the first control signal 18.

The first control signal 18 can be generated by taking a summation or an average of voltages during a certain period of time such as a unit data section of the FSK-modulated frequency deviation signal of the carrier wave signal 1. It is apparent from FIG. 10 that the judgement of the local oscillator frequency offset can be judged by doing this.

Furthermore, the first control signal 18 can be generated by holding judgement results in several unit-data-sections of the transmission signal of the FSK-modulated frequency deviation of the carrier wave signal 1 obtained by the output signal from the voltage judging means 17, so as to obtain an OR result from them.

Moreover, the first control signal 18 can be generated by obtaining an OR result by executing judgements at both of an upper and a lower sides of the second f/V judging line 94 of FIG. 9 on the basis of the output signal from the voltage judging means 17; i.e. at both of a higher and a lower sides of the output voltage of the voltage judging means 17, in a unit data section of the transmission signal of the FSK-modulated frequency deviation of the carrier wave signal 1.

In response to the first control signal 18, in the case where the offset of the local oscillator frequency is small, the third decode signal 24 is outputted from the decode signal processing circuit 25 by giving priority to the first decode signal 14 outputted from the decode circuit 15 on the basis of the judgement-of whether the FSK-modulated frequency deviation of the carrier wave 1 is a positive deviation or a negative deviation.

On the other hand, if the frequency offset $\Delta f$ of the local oscillator is increased to a certain large value, the frequency of base-band signal 8 is widely shifted upward or downward in accordance with the positive or negative deviation $\pm f_D$ of the FSK-modulated frequency of the carrier wave 1, as shown in FIG. 9. Accordingly, a plurality of voltage judging circuits are provided as the voltage judging means 17 in order to surely and easily carry out the judgement. Namely, by using a first f/V judging line 93, a judgement of whether the frequency of base-band signal 8 is high or low is executed to make a judgement of a positive or negative change of the FSK-modulated frequency deviation of the carrier wave 1. And, by using a second f/V judging line 94, a judgement of the frequency offset of the local oscillator can be done.

To make the judgement of a positive or negative change of the FSK-modulated frequency deviation of the carrier wave 1 from the judgement of whether the frequency of base-band signal 8 is high or low is, in the case where the local oscillator frequency offset is within the range 91 of FIG. 9, the voltage judging means 17 is required to make a judgement by taking a summation or an average of voltages in a unit-data-section of the FSK-modulated frequency deviation signal of the carrier wave signal 1 or to make a judgement with respect to the change of relationship between $\pm f_D$ and $\pm f_L$ in respective half periods of the unit-data-section of the FSK-modulated frequency deviation signal of the carrier wave signal 1.

On the contrary, in the case where the local oscillator frequency offset is outside of the range 91 of FIG. 9, the judgement result by the voltage judging means 17 is determined by the positive or negative deviation $\pm f_D$ of the FSK-modulated frequency deviation of the carrier wave signal 1 irrespective of the amount of $\pm f_L$. As a result, it is preferable for the judgement of the local oscillator frequency offset to select the outside of the range 91. However, the judgement of whether the FSK-modulated frequency deviation of the carrier wave 1 is a positive deviation or a negative deviation cannot be done by use of only the high-low of output voltage of the voltage judging means 17 unless the polarity of the local oscillator frequency offset $\Delta f$ is already known.

However, the positive or negative change of the frequency deviation can be judged. In the case where the output voltage of the voltage judging means 17 varies up and down, its signal becomes either of in-phase or opposite-phase with respect to the first decode signal 14 depend on the polarity of the local oscillator frequency offset $\Delta f$.

Further, the local oscillator frequency offset is generated in a longer time range compared with the time corresponding to the transmission bit-rate. Therefore, it should not be considered that it suddenly changes during a changing of the positive or negative deviation of the FSK-modulated frequency of the carrier wave; i.e. during a changing of high-and-low of the base-band signal frequency.

Accordingly, the local oscillator frequency offset can be judged in advance by the voltage judging means 17 and the control signal generating circuit 19. On the other hand, there are provided an in-phase/opposite-phase judging circuit 20 and a signal inversion & selection circuit 21. And, if the judgement of whether the FSK-modulated frequency deviation of the carrier wave signal 1 is a positive deviation or a negative deviation tan be done in either side of a higher side and a lower side of the base-band signal frequency 8, usually in the higher side, it is understood that the polarity of the local oscillator frequency offset can be automatically detected. Therefore, the only thing need to be done is to judge the high or low of the base-band signal 8.

Accordingly, in the case where it is judged by the voltage judging means 17 that the frequency of base-band signal 8 is high, the equivalent modulation index is large and therefore reliability of judgement is increased. Therefore, the judgement of in-phase/opposite-phase relationship between the first decode signal 14 and the output signal from the voltage judging means 17 is carried out by the in-phase/opposite-phase judging circuit 20.

If the output signal of the voltage judging means 17 is the same phase as the first decode signal 14, the signal inversion & selection circuit 21 outputs the signal as a second decode signal 23 without any change. To the contrary, if the output signal of the voltage judging means 17 is opposite phase as the first decode signal 14, the signal inversion & selection circuit 21 inverts the signal and outputs it as the second decode signal 23. Completion of the judgement of in-phase/opposite-phase relationship results in the automatic completion of judgement regarding polarity of the local oscillator frequency offset.

In the case Where it is judged by the voltage judging means 17 that the frequency of base-band signal 8 is low, the equivalent modulation index is small and therefore the reliability of the judgement of whether the FSK-modulated frequency deviation of the carrier wave 1 is a positive deviation or a negative deviation by the first decode signal is deteriorated.

However, regarding to the judgement of frequency change, the larger the frequency offset of the local oscillator becomes, the more advantageous the judgement of frequency change becomes. Therefore, the judgement of the frequency change of the base-band signal 8 and the decoding by use of information of in-phase/opposite-phase relationship can be done. Therefore, while the output signal of the in-phase/opposite-phase judging circuit 20 holds the previous switching condition, the signal from the voltage judging means 17 is outputted through the signal inversion & selection circuit 21 as the second decode signal 23. In response to the first control signal 18, the second decode signal 23 is outputted, given priority, from the decode signal processing circuit 25 as the third decode signal 24. By using thus obtained third decode signal 24, the data demodulation is carried out.

Next, explained hereinafter are operations of a second control signal 26 provided in addition to the first control signal 18 as one output of the control signal generating circuit 19, the intermittent operation control signal 27, the first and the second electric power supply circuit 28, 29, and the switching circuit 30 for connecting or disconnecting the FSK-modulated local oscillator signal.

First of all, the second control signal 26 generates a signal similar to the first control signal 18 in accordance with the local oscillator frequency offset amount, after having obtained either decoding result of the first and the second decode signals 14, 23. The intermittent operation control signal 27 is selected to cause an intermittent operation with a shorter time interval than a time during which the local oscillator frequency offset of allowable width is generated in selecting the first and the second decode signals 14, 23.

In the case where the local oscillator frequency remains in a small value in accordance with the first control signal 18, the second electric power supply circuit 29 supplies a voltage output intermittently to the means for obtaining the second decode signal 23 on the basis of the second control signal 26 and the intermittent operation control signal 27, after having obtained a signal from the first decode signal 14 as the third decode signal 24. With this arrangement, the change of the first control signal 18 which reflects the local oscillator frequency offset is intermittently checked.

Furthermore, by setting the judging line by the first control signal 18 to a central portion or its vicinity of the local oscillator frequency offset range capable of decoding by any of the first and the second decode signals 14, 23 which are mutually opposite in advantage/disadvantage relationship with respect to the local oscillator frequency offset, the allowable width with respect to the local oscillator frequency offset can be increased and the time period of intermittent operation can be enlarged.

In the case where the local oscillator frequency becomes large in accordance with the first control signal 18, since the judgement of the polarity of the local oscillator frequency is already done after the second decode signal 23 has been obtained, the all thing required further is to judge the change of high-low in the frequency of the base-band signal 8.

Accordingly, if the second decode signal 23 side is operated, it is not necessary to add the FSK-modulated local oscillator signal 5, being phase-adjusted, to the local oscillator 2.

Therefore, in response to the second control signal 26 which can automatically judge the local oscillator frequency offset, an output voltage supply from the first electric power supply circuit 28 to the switching circuit 30 and the means for obtaining the first decode signal 14 is controlled. That is, by disconnecting the FSK-modulated local oscillator signal when the local oscillator frequency offset is large, it becomes possible to prevent an excessive enlargement of the band width of the filter 7; i.e. the base-band filter, which band width is determined by a summation of the FSK-modulated frequency deviation of the carrier wave, the local oscillator frequency offset, and the FSK-modulated local oscillator signal. Furthermore, it is also possible to save electric power consumption by turning off the electric power as occasion demands.

As is apparent from the foregoing description, in accordance with this embodiment, while constituted as a direct-conversion receiver, two decode circuits which are a decode circuit advantageous against local oscillator frequency offset and a decode circuit disadvantageous against local oscillator frequency offset are both utilized so as to use their decoding results in accordance with the equivalent modulation index.

Furthermore, the electric power source is turned off so as not to supply its output voltage to the decode circuit being not in use. And the FSK-modulated local oscillator signal is disconnected occasionally. Thus, it becomes possible to prevent the excessive enlargement of the band width of the receiving filter and to save electric power consumption.

Therefore, property deterioration against the offset of local oscillator frequency which becomes remarkable as the transmission speed increases can be suppressed. Thus, in accordance with high-speed data transmission, a demodulation can be realized in a wide receiving band width by virtue of the enlargement of the allowable width of frequency offset between the local oscillator frequency and the carrier wave. As a result, it becomes possible to apply it to a high frequency band in which the frequency stability is decreased. And, the demodulation system suitable for saving electric power consumption and realizing an integrated circuit is obtained.

FOURTH EMBODIMENT

Figure 5:
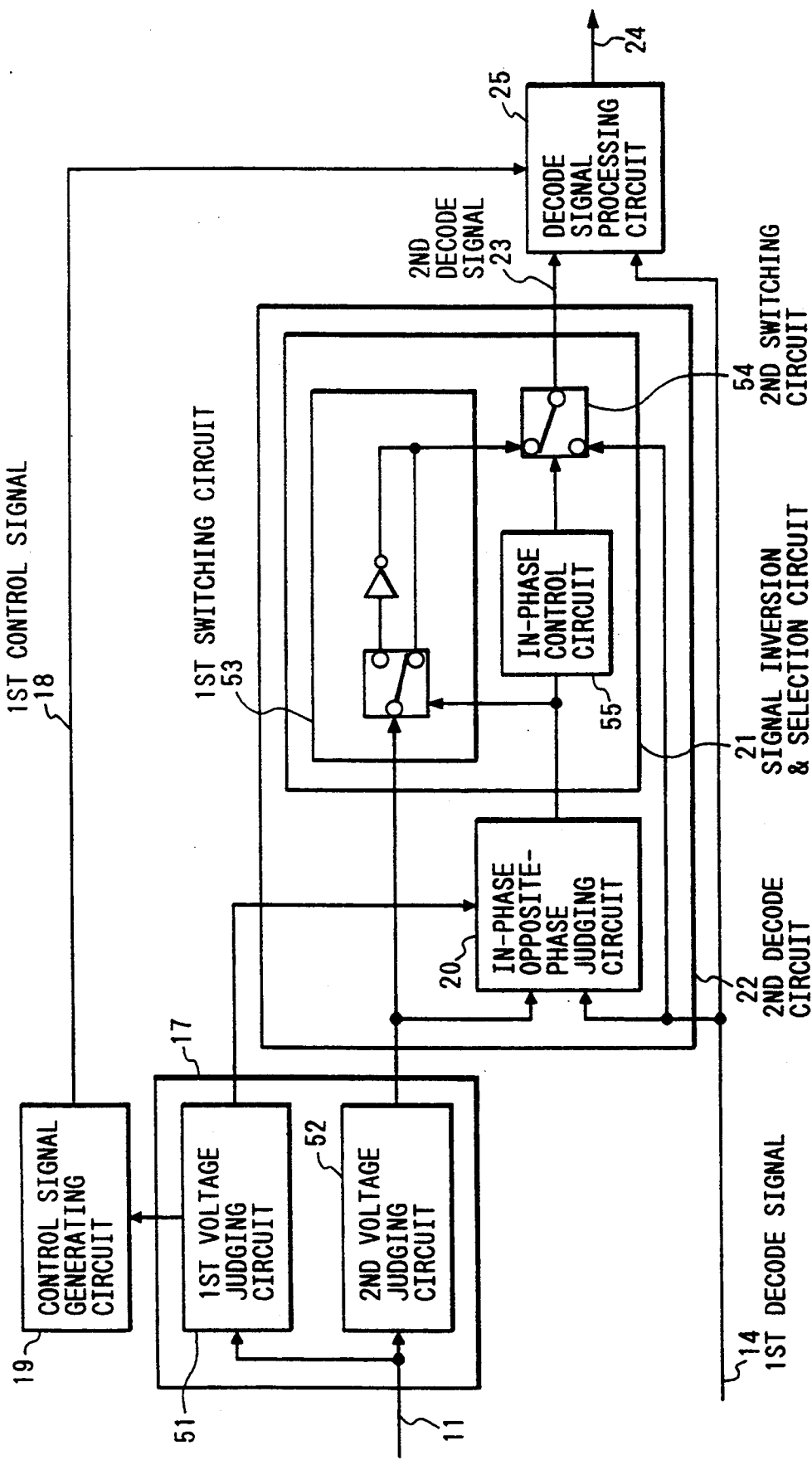
FIG. 5 is a circuit system diagram of a second decode circuit including its vicinity including a second decode circuit in accordance with a fourth embodiment of the present invention.

Hereinafter, with reference to FIG. 5, a fourth embodiment of the present invention is explained. FIG. 5 is a detail circuit system diagram including a second decode circuit 22 in a receiver embodying an FSK data receiving system in accordance with the present invention. The following description explains its constitution and its operation.

As the first voltage judging means 17, there are provided the first and the second voltage judging circuits 51, 52. In FIG. 9, the first voltage judging circuit 51 executes a judgement of the local oscillator frequency offset by use of the second f/V judging line 94. The second voltage judging circuit 52 executes a judgement of the frequency change of the base-band signal 8 by use of the first f/V judging line 93.

At one side of an upper side and a lower side of the output signal from the first voltage judging circuit 51, the in-phase/opposite-phase judging circuit 20 makes a judgement of whether the output signal of the second voltage judging circuit 52 and the first decode signal 14 are in-phase or opposite-phase. Furthermore, as the signal inversion & selection circuit 21, there are provided the first and the second switching circuits 53, 54 and an in-phase control circuit 55 for switching the second switching circuit 54 so as to obtain the first decode signal 14 in case of in-phase condition.

The first switching circuit 53 executes a switching operation in such a manner that an output signal of the second voltage judging circuit 52 is inverted in case of opposite-phase and is not inverted in case of in-phase. Furthermore, the second switching circuit 54 outputs the inversion output signal of the first switching circuit 53 in case of opposite-phase and outputs the first decode signal 14 in case of in-phase.

By doing above-described operation in response to the output signal of the in-phase/opposite-phase judging circuit 20, not only the second decode signal 23 is obtained but, at the same time, the frequency change of the base-band signal 8 and the positive/negative direction of the frequency offset of the local oscillator are automatically judged.

At the other side of the higher and lower sides in the output signal of the first voltage judging circuit 51, the switching by the output signal of the in-phase/opposite-phase judging circuit 20 is not carried out. The first switching circuit 53 holds the previous condition, and the second switching circuit 54 is set to send out the output signal of the second voltage judging circuit 52 through the first and the second switching circuits 53, 54 as the second decode signal 23. Thus, FIG. 5 discloses one embodiment realizing the second decode circuit 22 having above-described constitution and the operation.

As is apparent from the foregoing description, in accordance with this embodiment, it becomes possible to realize the second decode circuit 22 and therefore the FSK data receiving system having the same capability as the third embodiment.

FIFTH EMBODIMENT

Figure 6A:
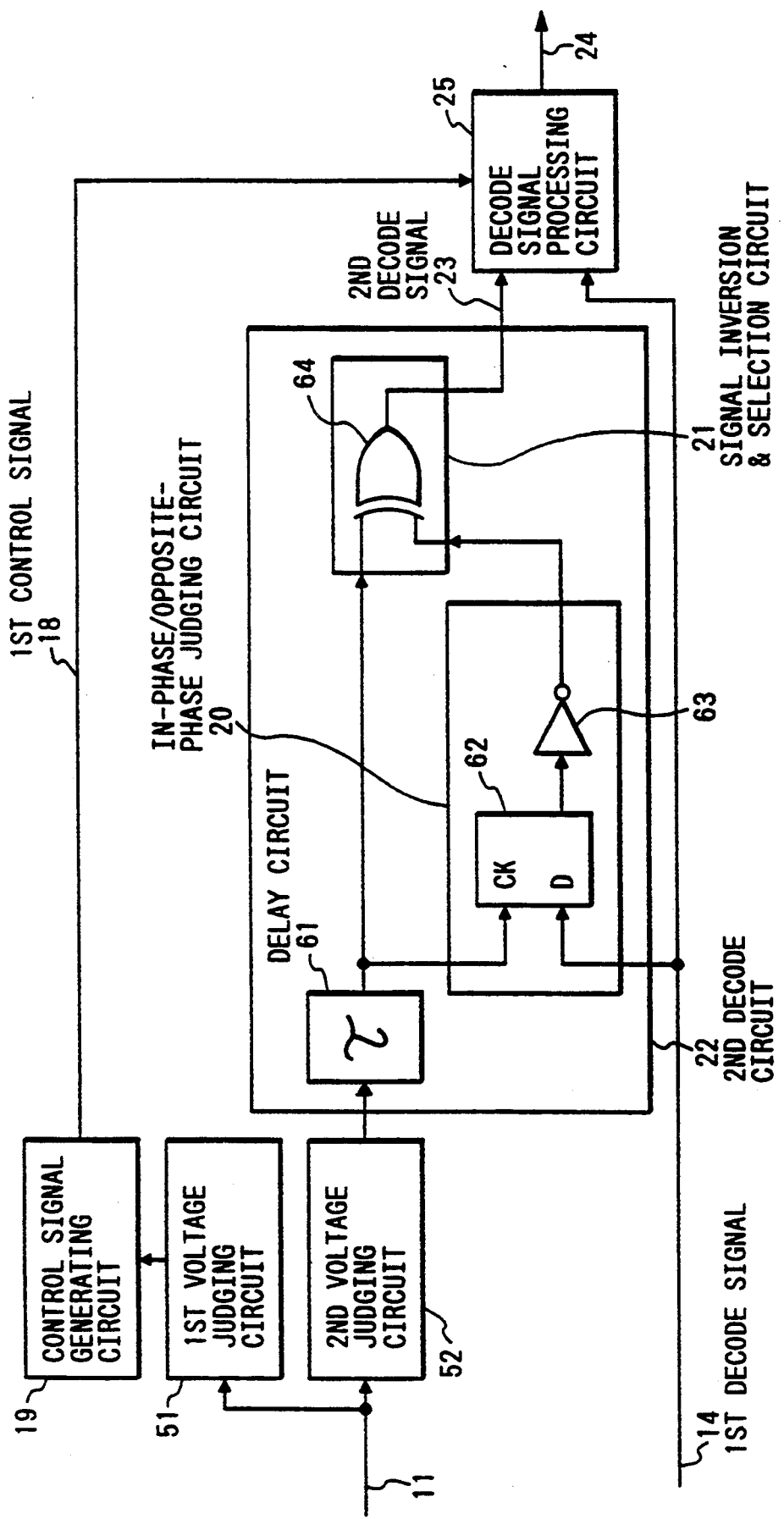

Hereinafter, with reference to FIG. 6, a fifth embodiment of the present invention is explained. FIG. 6 is a detail circuit system diagram including the second decode circuit 22 in a receiver embodying an FSK data receiving system in accordance with the present invention. The embodiment of FIG. 6 includes a D-type flip-flop circuit 62, a signal inversion circuit 63, and an exclusive-OR circuit 64 as the in-phase/opposite-phase judging circuit 20 and the signal inversion & selection circuit 21 constituting the second decode circuit 22.

With this arrangement, its operation is explained hereinafter. An output signal of the first or the second voltage judging circuits 51, 52 is delayed with respect to the first decode signal 14 in the delay circuit 61 by a delay time less than a half period of the maximum signal transmission frequency. An output signal of the delay circuit 61 is supplied to the D-type flip-flop circuit 62 as a clock input. The first decode signal 14 is supplied to the D-type flip-flop circuit 62 as a D-input.

The output signal of the second voltage judging circuit 52 is compared with the first decode signal 14 in its transmission signal only when the output signal of the second voltage judging circuit 52 is high. When the first decode signal 14 is high and in-phase, the output of the D-type flip-flop circuit 62 becomes high and the output signal of the signal inversion circuit 63 becomes low.

Furthermore, when the output signal of the second voltage judging circuit 52 is high and the first decode signal 14 is low and opposite-phase, the output of the D-type flip-flop circuit 62 becomes low and the output signal of the signal inversion circuit 63 becomes high. In this manner, the judgement of in-phase/opposite-phase relationship between the output signal of the second voltage judging circuit 52 and the first decode signal 14 can be done.

Furthermore, if the output signal of the second voltage judging circuit 52 and the output signal of the signal inversion circuit 63 are inputted to the exclusive-OR circuit 64 which serves as the signal inversion & selection circuit 21, the output signal of the exclusive-OR circuit 64 is obtained by inverting the output signal of the second voltage judging circuit 52 in case of opposite-phase and is obtained by not inverting it in case of in-phase.

At the same time, the frequency change of the base-band signal 8 and the judgement of positive/negative direction of the local oscillator frequency offset are automatically judged. And, the second decode signal 23 is obtained as an output of the signal inversion & selection circuit 21.

As apparent from the foregoing explanation, in accordance with this embodiment, the second decode circuit 22 can be realized by a relatively simple circuit. Thus, the FSK data receiving system having the same capability as the third embodiment can be obtained.

SIXTH EMBODIMENT

Figure 12:
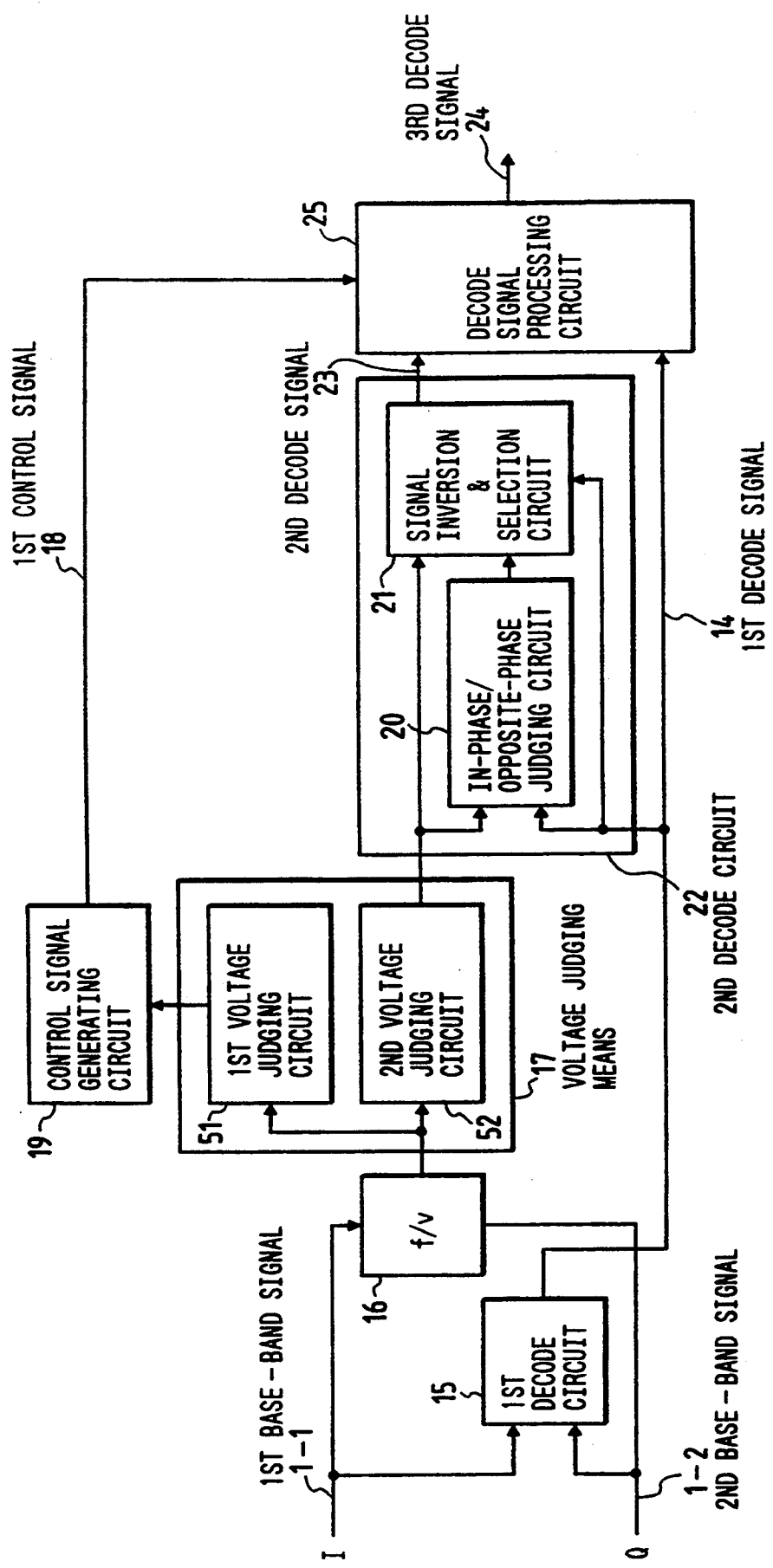
FIG. 12 is a circuit system diagram showing a main portion of a demodulation circuit embodying an FSK demodulation system in accordance with a sixth embodiment of the present invention.

Hereinafter, with reference to FIG. 12, a sixth embodiment of the present invention is explained. FIG. 12 is a circuit system diagram showing a main portion of a demodulation circuit embodying an FSK demodulation system in accordance with the present invention. In FIG. 12, there is provided a first decode circuit 15 which judges whether the FSK-modulated frequency signal has a positive deviation or a negative deviation on the basis of a mutual phase relationship between a first and a second base-band signals which are usually called as an I-signal and a Q-signal, since the first and the second base-band signals have quadrature phases with each other and their phases are relatively inverted, so as to output the first decode signal 14.

In addition to the first decode circuit 15, there is provided a frequency-voltage conversion circuit 16 for converting frequencies of the first base-band signal 1-1 or the second base-band signal 1-2 in a form of voltages. And, as a voltage judging means 17, there are provided a first and a second voltage judging means 51, 52 which have input voltages outputted from the frequency-voltage conversion circuit 16. And further there is provided a control signal generating circuit 19 for obtaining the first control signal 18 based on the signal fed from the first voltage judging means 51. Moreover, there is provided a second decode circuit 22 which includes an in-phase/opposite-phase judging circuit 20 for judging whether the first decode signal 14 and the output signal of the voltage judging means 17 are in-phase or opposite-phase on the basis of the output signal of the first or the second voltage judging means 51, 52 and a signal inversion & selection circuit 21 for selecting any one of the output signal of the second voltage judging circuit 52, and its inversion signal, and the first decode signal 14 in accordance with the output signal of the in-phase/opposite-phase judging circuit 20. Thus, the second decode signal 23 is obtained as an output signal of the signal inversion & selection circuit 21; i.e. as an output signal of the second decode circuit 22.

Still further, there is provided a decode signal processing circuit 25 for inputting the first and the second decode signals 14, 23 and obtaining the third signal 24 in response to the first control signal 18. And then, the data demodulation is executed by use of the third decode signal 24.

With above arrangement, its operation is explained hereinafter. As explained in the third embodiment, if a transmission bit rate is speeded up with respect to the FSK-modulated frequency deviation, the frequency components of the FSK-modulated frequency deviation included in one bit transmission are decreased. Therefore, a modulation index defined in the following equation becomes small.

Modulation index=(Maximum frequency deviation)/(Maximum signal transmission frequency)

In the case where the modulation index is small, the data judgement must be carried out by use of decreased frequency components. Accordingly, it is disadvantageous in the data demodulation.

Furthermore, in a direct-conversion receiving system, if the local oscillator frequency is offset, the base-band signal frequency is increased or decreased in response to the positive or negative frequency deviation of the FSK-modulated data and, thus, the equivalent modulation index defined by the following equation becomes to take a large or a small value.

Equivalent modulation index = (Base-band signal frequency)/

(Maximum signal transmission frequency) = (Modulation index) ± (Local oscillator frequency offset/Maximum signal transmission frequency)

Especially, when the base-band signal frequency is low, the frequency components of the base-band signal is decreased and the equivalent modulation index which shows frequency components of the base-band signal included in one-bit-transmission becomes small. Therefore, it is disadvantageous for executing the data demodulation properly.

Accordingly, in addition to the first decode circuit 15 which outputs the first decode signal 14 obtained by judging whether the FSK-modulated signal has a positive deviation or a negative deviation on the basis of the phase relationship of the first and the second base-band signals 1-1, 1-2 which are usually called as an I-signal and a Q-signal, there are provided the frequency-voltage conversion circuit 16 for converting the frequency of base-band signal into a form of voltage and the first and the second voltage judging means 81, 52 for inputting the output of the frequency-voltage conversion circuit 16. And further, there is provided the control signal generating circuit 19 which judges the offset of local oscillator frequency based on an output signal of the first voltage judging circuit 51 to obtain the first control signal 18.

The first control signal 18 can be generated by holding the output signal from the first voltage judging circuit 51 for a certain period of time, for example, during several bit rates, to take an OR result etc.

In response to the first control signal 18, in the case where the offset of the local oscillator frequency is small, the third decode signal 24 is outputted from the decode signal processing circuit 25 by giving priority to the first decode signal 14 outputted from the first decode circuit 15 on the basis of the judgement of whether the FSK-modulated frequency signal has a positive deviation or a negative deviation.

On the other hand, if the frequency offset $\Delta f$ of the local oscillator is increased to a certain large value, the frequency of base-band signal is widely shifted upward or downward in accordance with the positive frequency deviation $+f_D$ and a negative frequency deviation $-f_D$ of the FSK-modulated frequency, as shown in FIG. 9. Accordingly, the second f/V judging line 94 is set by use of the first voltage judging circuit 51. In the case where the frequency offset $\Delta f$ of the local oscillator is small and therefore remains within the second f/V judging line 94, the output of the first voltage judging circuit 51 does not change even if the output voltage from the frequency-voltage conversion circuit 16 is changed. On the contrary, in the case where the frequency offset $\Delta f$ of the local oscillator exceeds the second f/V judging line 94, the output voltage of the first voltage judging circuit 51 changes up and down.

However, the judgement of whether the FSK-modulated frequency has the positive deviation $+f_D$ or the negative deviation $-f_D$ cannot be done by use of only the high-low of output voltage from the first voltage judging circuit 51 unless the polarity of the local oscillator frequency offset $\Delta f$ is already known.

However, the changes of the positive or negative frequency deviations $+f_D$, $-f_D$ can be judged. In the case where the output voltage of the first voltage judging circuit 81 varies up and down, its signal becomes either of in-phase or opposite-phase with respect to the first decode signal 14.

With respect to the frequency offset $\Delta f$, in the case where the output voltage of the first voltage judging circuit 51 is changed up and down, the first control signal 18 can be generated by the control signal generating circuit 19, for example, by an appropriate method for holding either of a high or a low output signal of the first voltage judging circuit 51 for a certain period of time.

Moreover, in order to judge high/low of the base-band frequency, there is provided the second voltage judging circuit 52 having the first f/V judging line 93 is provided independent of the first voltage judging circuit 51 so that the judgement can be surely executed by using the first f/V judging line 93 even in the vicinity of the second f/V judging line 94.

Further, the local oscillator frequency offset is generated in a longer time range compared with the time corresponding to the transmission bit-rate. Therefore, it should not be considered that it suddenly changes during a changing of the positive or negative deviation of the FSK-modulated frequency; i.e. during a changing of high-and-low of the base-band signal frequency.

Accordingly, the local oscillator frequency offset can be judged in advance by the first voltage judging circuit 51 and the control signal generating circuit 19. On the other hand, there are provided the in-phase/opposite-phase judging circuit 20 and the signal inversion & selection circuit 21. And, if the judgement of whether the FSK-modulated frequency deviation is a positive deviation or a negative deviation can be done in either of a higher side and a lower side of the base-band signal frequency, it is understood that the polarity of the local oscillator frequency offset can be automatically detected. Therefore, the only thing need to be done is to judge the high/low change of the base-band signal.

Accordingly, in the case where it is judged by the second voltage judging circuit 52 that the frequency of base-band signal is high, the equivalent modulation index is large and therefore reliability of judgement is increased. Therefore, the judgement of in-phase/opposite-phase relationship between the first decode signal 14 and the output signal from the second voltage judging circuit 52 is carried out by the in-phase/opposite-phase judging circuit 20.

If the output signal of the second voltage judging circuit 52 is the same phase as the first decode signal 14, the signal inversion & selection circuit 21 outputs the signal as a second decode signal 23 without any change, or the first decode signal 14 is outputted. To the contrary, if the output signal of the second voltage judging circuit 52 is opposite phase as the first decode signal 14, the signal inversion & selection circuit 21 inverts the signal and outputs it as the second decode signal 23. Completion of the judgement of in-phase/opposite-phase relationship results in the automatic completion of judgement regarding polarity of the local oscillator frequency offset.

In the case where it is judged by the second voltage judging circuit 52 that the frequency of base-band signal is low, the equivalent modulation index is small and therefore the reliability of the judgement of whether the FSK-modulated frequency signal has a positive deviation or a negative deviation by use of the first decode signal 14 is deteriorated.

However, the larger the frequency offset of the local oscillator becomes, the more advantageous the judgement of frequency change becomes. Therefore, the judgement of the frequency change of the base-band signal and the decoding by use of information of in-phase/opposite-phase relationship can be done. Therefore, while the output signal of the in-phase/opposite-phase judging circuit 20 holds the previous switching condition, the signal from the second voltage judging circuit 52 is outputted through the signal inversion & selection circuit 21 as the second decode signal 23. In response to the first control signal 18, the second decode signal 23 is outputted, given priority, from the decode signal processing circuit 25 as the third decode signal 24.

By using thus obtained third decode signal 24, the data demodulation is carried out.

As is apparent from the foregoing description, in accordance with this embodiment, while constituted as a direct-conversion receiver, two decode circuits which are a decode circuit advantageous against local oscillator frequency offset and a decode circuit disadvantageous against local oscillator frequency offset are both utilized so as to use their decoding results in accordance with the equivalent modulation index.

Therefore, property deterioration against the offset of local oscillator frequency which becomes remarkable as the transmission speed increases can be suppressed. Thus, in accordance with high-speed data transmission, a demodulation can be realized in a wide receiving band width by virtue of the enlargement of the allowable width of frequency offset between the local oscillator frequency and the carrier wave. As a result, it becomes possible to apply it to a high frequency band in which the frequency stability is decreased. And, the demodulation system suitable for integrated circuit is obtained.

SEVENTH EMBODIMENT

Figure 13:
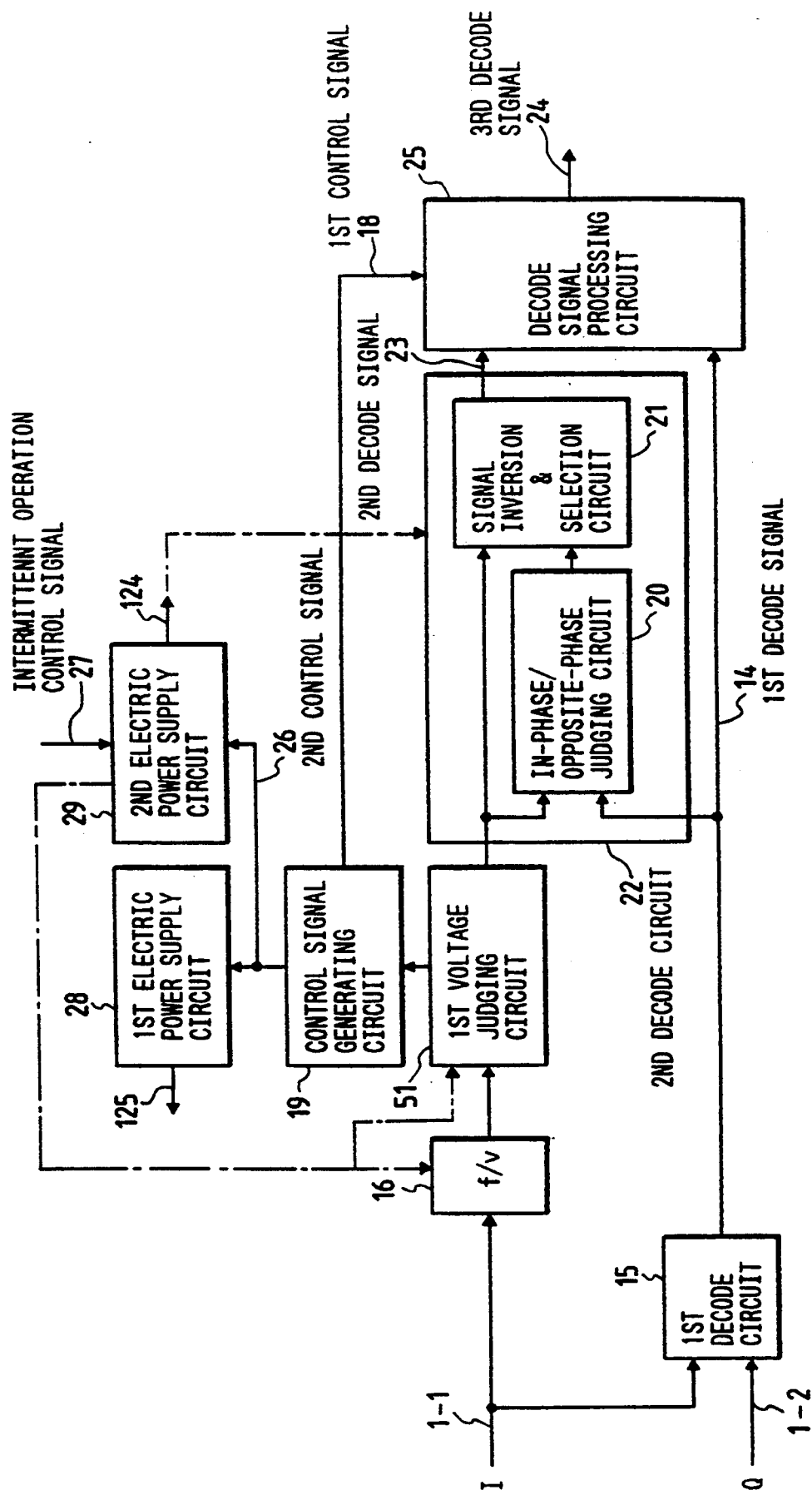
FIG. 13 is a circuit system diagram showing a main portion of a demodulation circuit embodying an FSK demodulation system in accordance with a seventh embodiment of the present invention.

Hereinafter, with reference to FIG. 13, a seventh embodiment of the present invention is explained. FIG. 13 is a circuit system diagram showing a main portion of a demodulation circuit embodying an FSK demodulation system in accordance with the present invention. FIG. 13 is different from FIG. 12 in that the input signal to the frequency-voltage conversion circuit 16 is only the first base-band signal 1-1, in that the output signal from the first voltage judging circuit 51 is used instead of the output signal from the second voltage judging circuit 52 and therefore the second voltage judging circuit 52 is removed, and in that a second control signal 26, an intermittent operation control signal 27, and first and second electric power supply circuits 28, 29 are provided in addition to the signal system in the second decode circuit 22 and the first control signal 18 outputted from the control signal generating circuit 19.

With this arrangement, its operation is explained hereinafter. Since the basic operation of this seventh embodiment is the same as the sixth embodiment. Their differences are explained hereinafter.

First of all, in FIG. 13, the reason why the input signal to the frequency-voltage conversion circuit 16 is only the first base-band signal I (i.e. 1-1) is that the frequency change of the base-band signal due to the frequency offset of local oscillator can be detected both of the first and second base-band signals similarly and therefore the judgement can be executed by using at least either signal.

Furthermore, regarding the judgement of high/low of the base-band frequency, though the output signal from the first voltage judging circuit 51 is utilized instead of the output signal of the second voltage judging circuit 52 so that the second voltage judging circuit 52 can be eliminated, this is because the frequency offset of the local oscillator in the vicinity of the second f/V judging line 94 of FIG. 9 is not irregular within a short period of time and accordingly the control signal can be surely generated in the control signal generating circuit 19. If so, it is desirable to simplify the circuit constitution. Thus, this embodiment is shown as one of such a simplified circuit.

Moreover, the signal system in the second decode circuit shows a case where, in the sixth embodiment of the present invention, the output signal from the voltage judging means 17 is outputted without any change as the second decode signal 23 in case of the same phase as the first decode signal 14 and is outputted by being inverted as the second decode signal 23 in case of opposite phase as the first decode signal 14. In this case, since the first decode signal 14 is not used, the first decode signal 14 needs not be connected to the signal inversion & selection circuit 21.

Next, explained hereinafter are operations of the second control signal 26 provided in addition to the first control signal 18 as one output of the control signal generating circuit 19, the intermittent operation control signal 27, and the first and the second electric power supply circuit 28, 29.

First of all, the second control signal 26 generates a signal similar to the first control signal 18 in accordance with the local oscillator frequency offset amount, after having obtained either decoding result of the first and the second decode signals 14, 23. The intermittent operation control signal 27 is selected to cause an intermittent operation with a Shorter time interval than a time during which the local oscillator frequency offset of allowable width is generated in selecting the first and the second decode signals 14, 23.

In the case where it is judged that the local oscillator frequency remains in a small value in accordance with the first control signal 18, the second electric power supply circuit 29 supplies its voltage output 124 intermittently to the means for obtaining the second decode signal 23 on the basis of the second control signal 26 and the intermittent operation control signal 27, after having obtained a signal from the first decode signal 14 as the third decode signal 24. With this arrangement, the change of the first control signal 18 which reflects the local oscillator frequency offset is intermittently checked.

Furthermore, by setting the judging line by the first control signal 18 to a central portion or its vicinity of the local oscillator frequency offset range capable of decoding by any of the first and the second decode signals 14, 23 which are mutually opposite in advantage/disadvantage relationship with respect to the local oscillator frequency offset, the allowable width with respect to the local oscillator frequency offset can be increased and the time period of intermittent operation can be enlarged.

In the case where the local oscillator frequency becomes large in accordance with the first control signal 18, since the judgement of the polarity of the local oscillator frequency is already done after the second decode signal 23 has been obtained, the all thing required further is to judge the change of high-low in the frequency of the base-band signal.

Accordingly, if the second decode signal 23 side is operated, it is not necessary to apply the output voltage from the first electric power supply circuit 28.

Therefore, in response to the second control signal 26 which can automatically judge the local oscillator frequency offset, a supply of the output voltage 125 from the first electric power supply circuit 28 to the means for obtaining the first decode signal 14 such as a frequency mixer of local oscillator frequency band is controlled, so as to save electric power consumption.

As is apparent from the foregoing description, in accordance with this embodiment, while constituted as a direct-conversion receiver having a simple circuit constitution, two decode circuits which are a decode circuit advantageous against local oscillator frequency offset and a decode circuit disadvantageous against local oscillator frequency offset are both utilized so as to use their decoding results in accordance with the equivalent modulation index.

Furthermore, by controlling electric power supply to the demodulation circuit not being used, it becomes possible to save electric power consumption.

Therefore, property deterioration against the offset of local oscillator frequency which becomes remarkable as the transmission speed increases can be suppressed. Thus, in accordance with high-speed data transmission, a demodulation can be realized in a wide receiving band width by virtue of the enlargement of the allowable width of frequency offset between the local oscillator frequency and the carrier wave. As a result, it becomes possible to apply it to a high frequency band in which the frequency stability is decreased. And, the demodulation system suitable for integrated circuit is obtained.

EIGHTH EMBODIMENT

An eighth embodiment of the present invention can be constituted by using the second decode circuit and its vicinity circuit of the fourth embodiment shown in FIG. 5, in stead of the corresponding circuit portion of the sixth embodiment or the seventh embodiment. In other words, the eighth embodiment is the same as the fourth embodiment except that the eighth embodiment basically utilizes, as well as the sixth and the seventh embodiment, the first and the second base-band signals I, Q which are usually called as the I-signal and the Q-signal.

Accordingly, the first decode circuit and its vicinity circuit can be constituted in the same way as the sixth and the seventh embodiments. That is, though it is not specially disclosed for this eighth embodiment, there is provided a first decode circuit 15 which judges whether the FSK-modulated frequency signal has a positive deviation or a negative deviation on the basis of a mutual phase relationship between the first and the second base-band signals I, Q, which have quadrature phases with each other and their phases are relatively inverted. This first decode circuit 15 outputs the first decode signal 14.

In addition to the first decode circuit 15, there is provided a frequency-voltage conversion circuit 16 for converting frequencies of the first base-band signal I or the second base-band signal Q in a form of voltages to send out the output signal 11.

Thus obtained first decode signal 14 and the output signal 11 of the frequency-voltage conversion circuit 16 are inputted to the corresponding input terminals of the second decode circuit and its vicinity circuit of the fourth embodiment shown in FIG. 5. (The detail description of the FIG. 5 is already explained in the fourth embodiment.)

Namely, this eighth embodiment attains the purpose of the present invention by combining the first decode circuit and its vicinity circuit of the sixth or seventh embodiment shown in FIG. 12 or FIG. 13 with the second decode circuit and its vicinity circuit of the fourth embodiment shown in FIG. 5.

NINTH EMBODIMENT

A ninth embodiment of the present invention can be also constituted by using the second decode circuit and its vicinity circuit of the fifth embodiment shown in FIG. 6, instead of the corresponding circuit portion of the sixth embodiment or the seventh embodiment. That is, the eighth embodiment is the same as the fifth embodiment except that the ninth embodiment basically utilizes, as well as the sixth and the seventh embodiment, the first and the second base-band signals I, Q which are usually called as the I-signal and the Q-signal.

Namely,, this ninth embodiment attains the purpose of the present invention by combining the first decode circuit and its vicinity circuit of the sixth or seventh embodiment shown in FIG. 12 or FIG. 13 with the second decode circuit and its vicinity circuit of the fifth embodiment shown in FIG. 6.

DECODE SIGNAL PROCESSING CIRCUIT

Figure 7:
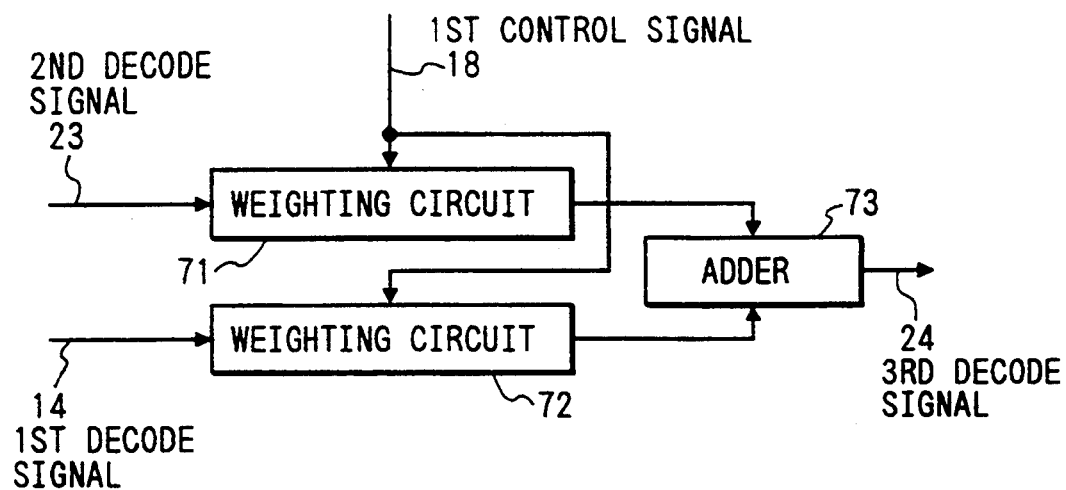
FIG. 7 is a functional schematic view showing one example of a decode signal processing circuit adopted in the third to the ninth embodiments of the present invention.
Figure 8:
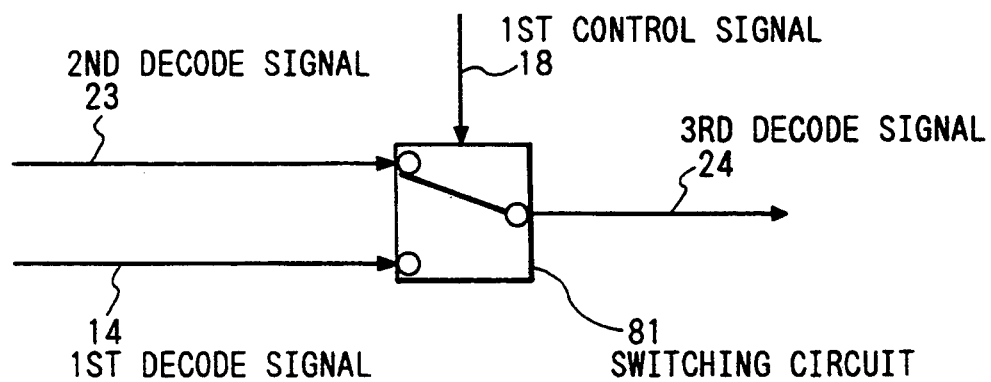
FIG. 8 is a circuit system diagram showing one example of the decode signal processing circuit adopted in the third to the ninth embodiments of the present invention.

FIG. 7 is a functional explanatory view showing one example of the decode signal processing circuit 25 adopted in the third to the ninth embodiments of the present invention. FIG. 8 is a circuit system diagram showing one example of the decode signal processing circuit 25 adopted in the third to the ninth embodiments of the present invention.

In FIG. 7, the first control signal 18 is obtained from an analogue output voltage of the frequency-voltage conversion circuit 16; i.e. the signal to be inputted into the voltage judging means 17, by the control signal generating circuit 19. The first decode signal 14 and the second decode signal 23 are weighted in weighting circuits 71, 72, respectively, in accordance with the first control signal 18 and, in turn, added in an adder 73 to obtain the third decode signal 24.

By constituting in this manner, no switching operation is required against local oscillator frequency offset. And, the first and the second decode signals 14, 23 can be sampled continuously. Furthermore, by utilizing results from two decode circuits having different characteristics with each other, it becomes possible to increase reliability in the data demodulation.

FIG. 8 shows an example of the decode signal processing circuit 25 including the signal processing means which obtains the first control signal 18 from the output signal of the voltage judging means 17 by the control signal generating circuit 19, switches the first decode signal 14 and the second decode signal 23 by the switching circuit 81 in response to the first control signal 18, and obtains the third decode signal 24.

With this arrangement, the control can be simplified. And, it will be further possible to save electric power consumption by combining the electric power voltage control such as the third embodiment of the present invention.

TENTH EMBODIMENT

Hereinafter, referring now to accompany drawings, a tenth embodiment of the present invention is explained in detail.

Figure 14:
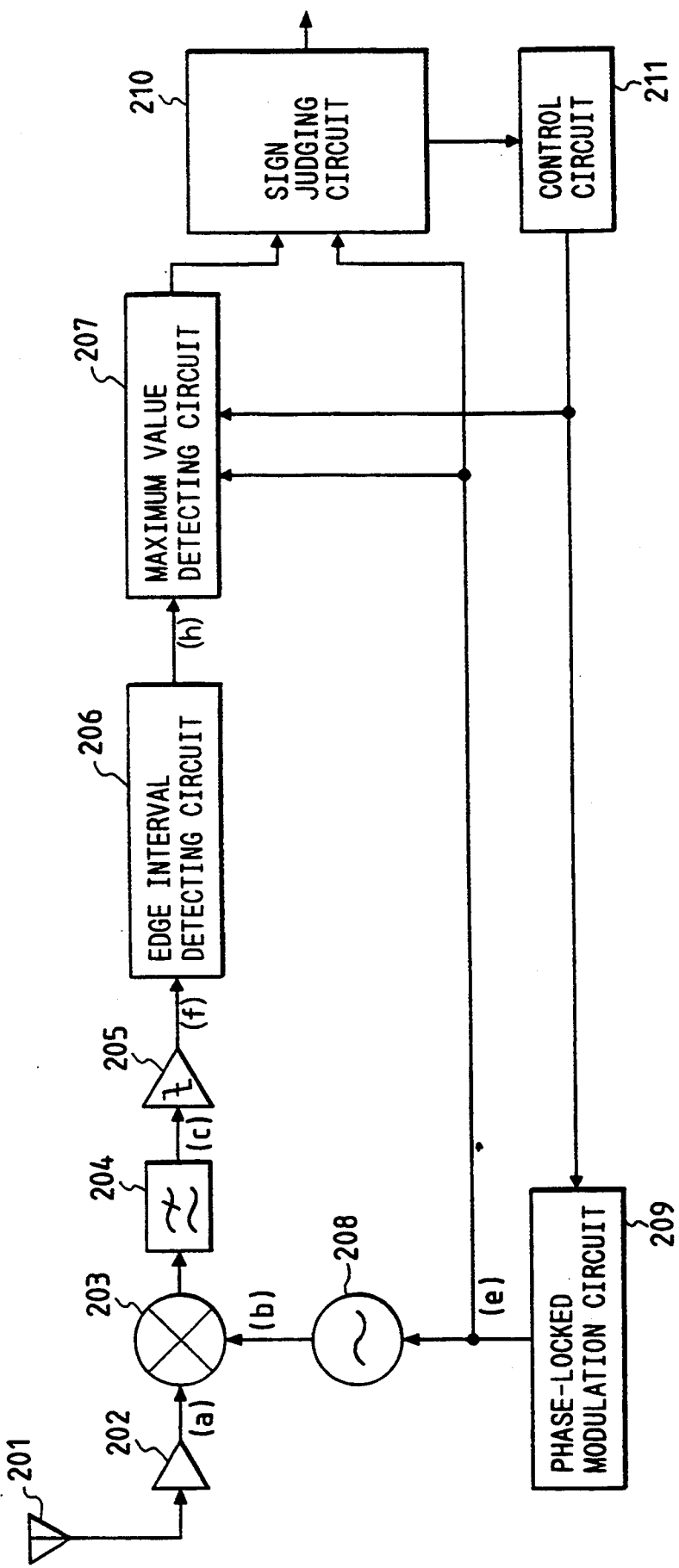
FIG. 14 is a block diagram showing an FSK data receiving apparatus in accordance with a tenth embodiment of the present invention.

FIG. 14 is a basic block diagram showing an FSK data receiving apparatus in accordance with one embodiment of the present invention. In FIG. 14, a reference numeral 201 denotes an antenna, and a reference numeral 202 denotes a low-noise amplifier circuit.. A reference numeral 203 denotes a mixer, and a reference numeral 204 denotes a low-pass filter. A reference numeral 205 denotes a limiter amplifier, and a reference numeral 206 is an edge interval detecting circuit. A reference numeral 207 denotes a maximum value detecting circuit, and a reference numeral 208 denotes a local oscillator. A reference numeral 209 denotes a phase-locked modulation circuit, and a reference numeral 210 denotes a sign judging circuit. A reference numeral 211 denotes a control circuit.

Figure 15:
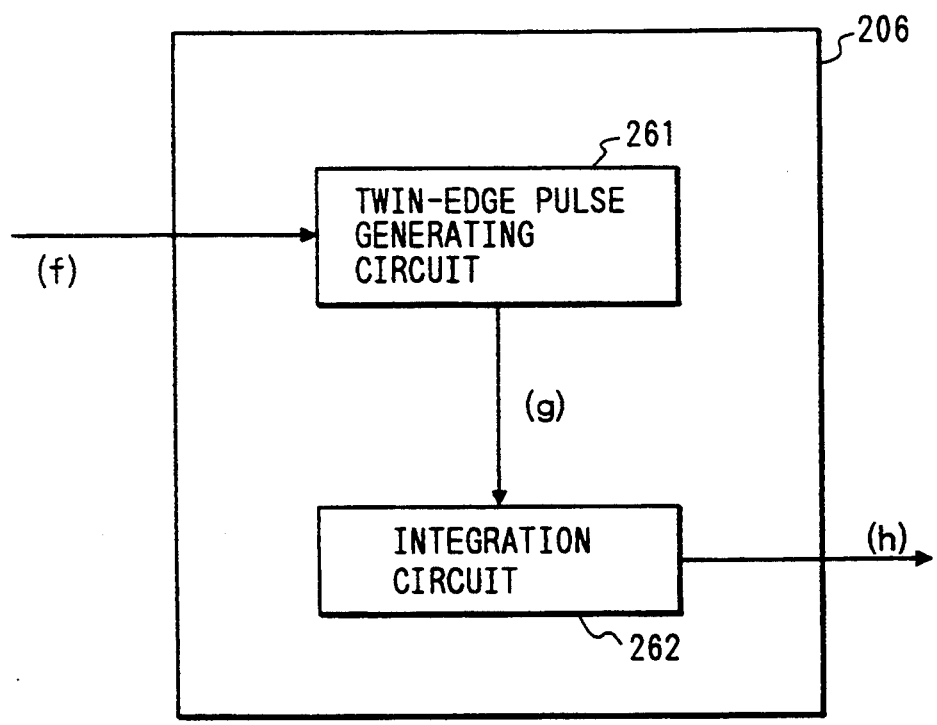
FIG. 15 is a detail block diagram showing a twin-edge interval detecting circuit, which is an essential part of the FSK data receiving apparatus in the tenth embodiment.
Figure 16:
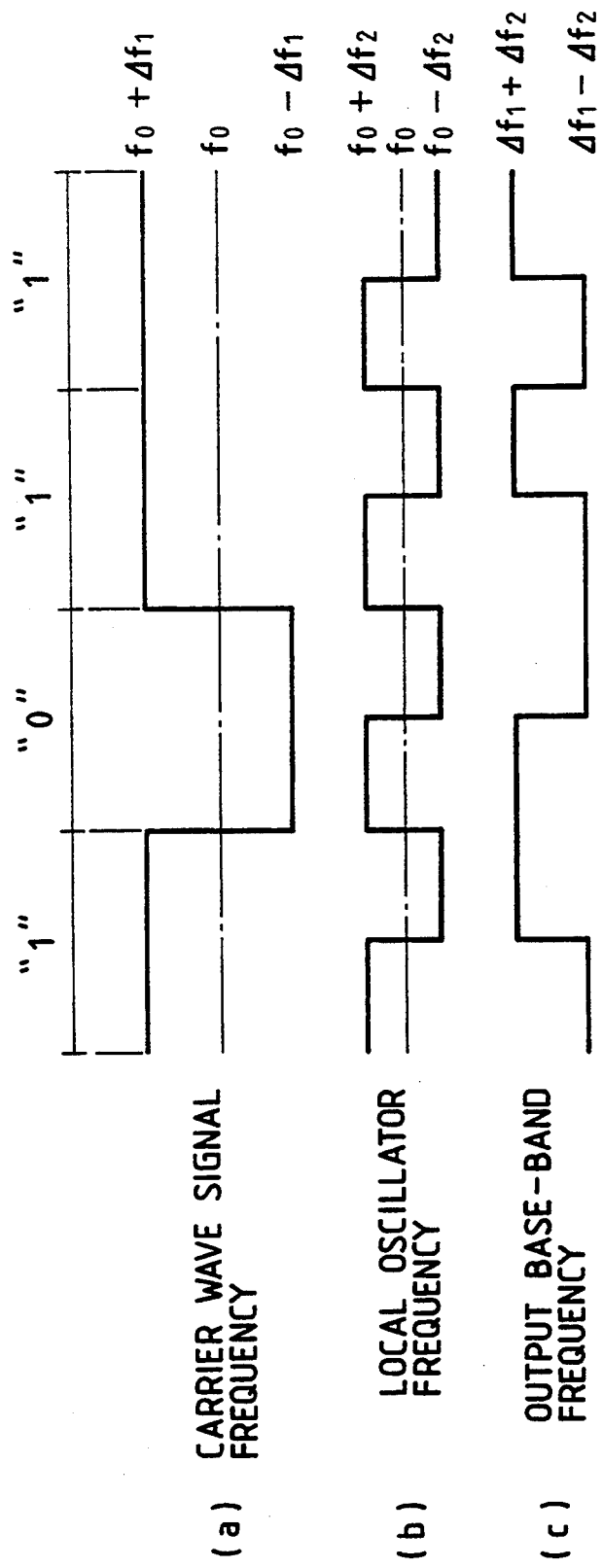
FIGS. 16(a–c) is a view showing waveforms of various portions in order for explaining an operation of the FSK data receiving apparatus in accordance with the tenth embodiment of the present invention.
Figure 17:
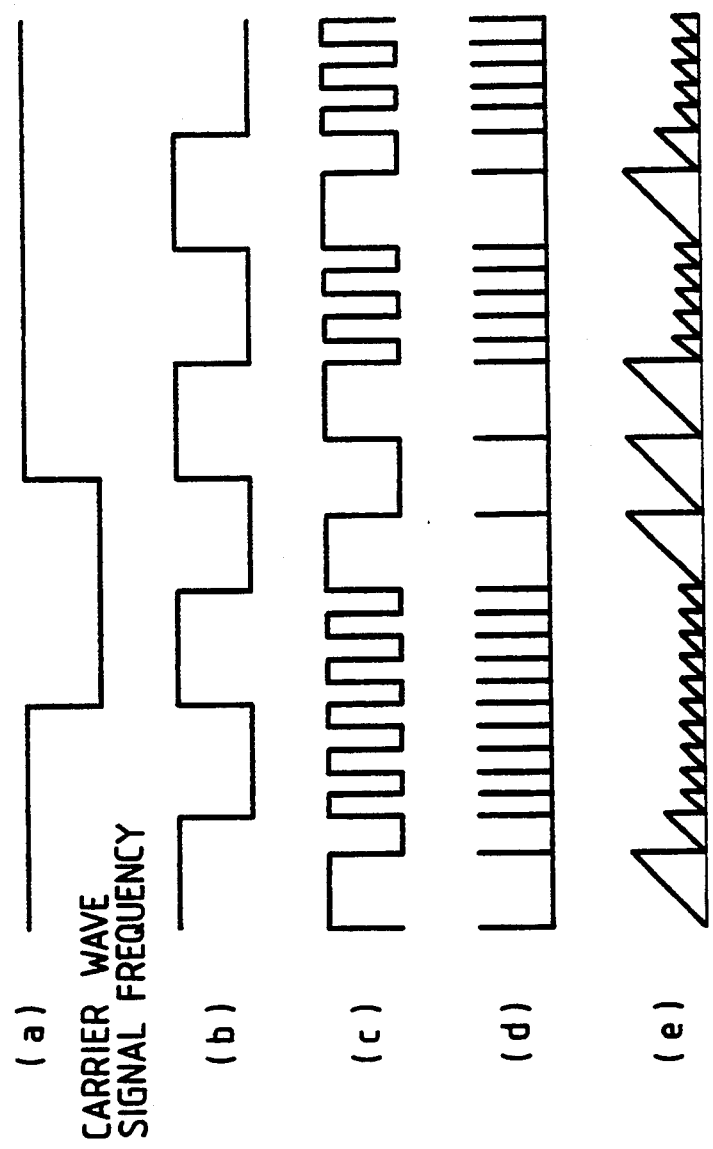
FIGS. 17(a–e) is a view showing waveforms of various portions in order for explaining an operation of a frequency discriminating circuit in accordance with the tenth embodiment of the present invention.

FIG. 15 is a block diagram of an edge interval detecting circuit in a tenth embodiment of the present invention. In FIG. 15, a reference numeral 261 denotes a twin-edge pulse generator, and a reference numeral 262 denotes an integration circuit. FIG. 16 is a view showing signal frequencies at various porions in the tenth embodiment of the present invention. And, FIG. 17 is a view showing waveforms of various portions in the edge interval detecting circuit in accordance with the tenth embodiment of the present invention.

In the FSK data receiving apparatus constituted above, its operation is explained with reference to signal frequencies of various portions shown in FIG. 16. First of all, the local oscillator signal is FSK-modulated so as to be phase-locked with the modulated data at a twice as large clock frequency as the modulated data.

In the case where the FSK data frequency is $f_0+f_1$, if the local oscillator signal is $f_0+\Delta f_2$, the base-band frequency becomes $|\Delta f_1-\Delta f_2|$, and also if the local oscillator signal is $f_0-\Delta f_2$, the base-band frequency becomes $|\Delta f_1+\Delta f_2|$.

To the contrary, in the case where the FSK data frequency is $f_0-f_1$, if the local oscillator signal is $f_0+\Delta f_2$, the base-band frequency becomes $|\Delta f_1+\Delta f_2|$, and also if the local oscillator signal is $f_0-\Delta f_2$, the base-band frequency becomes $|\Delta f_1-\Delta f_2|$. In this manner, by combining the modulation direction of the local oscillator signal ($+\Delta f_2$ or $-\Delta f_2$) and the frequency of the base-band signal ($\Delta f_1+\Delta f_2$ or $\Delta f_1-\Delta f_2$), it becomes possible to discriminate whether the modulation data is "1" or "0". This sign judgement can be easily constituted by the exclusive-OR circuit.

If converted into the base-band signal by the direct-conversion system, the frequency deviation of the carrier wave signal becomes the base-band signal frequency. For example, if supposed that the frequency deviation is ±4 kHz and the frequency deviation of the local oscillator frequency is ±2 kHz, frequencies of the base-band signal become 6 kHz and 2 kHz.

In such a frequency deviation, if the data transmission rate is increased to a high-speed such as 1200 bps, the base-band signal included in one bit symbol of the data becomes 5 or 1.7 periods. On the other hand, in the present invention, the frequency of the local oscillator signal is switched during one bit symbol, and the base-band signal is discriminated during that time. Therefore, in order to execute the discrimination, it is required to discriminate frequency from signals of 2.5 or 0.85 periods.

Especially, if required to realize the discrimination even in the case where the transmission speed is increased to a high speed, the frequency discrimination cannot be realized by use of a delay detection method or a pulse count method utilized in an ordinary KM receiver. Accordingly, in order to discriminate the frequency during ½ bit symbol, a method for detecting a maximum period of the base-band signal included during that time is required.

Its operation is explained hereinafter, using various waveforms in the frequency discriminating circuit of the tenth embodiment shown in FIG. 17. The base-band signal is waveform-shaped into a rectangular waveform in the limiter amplifier 205. Subsequently, its building-up and trailing-edge are detected in the twin-edge pulse detecting circuit 261.

And the twin-edge pulse detecting circuit 261 generates output pulses. The integration circuit 262 integrates a constant voltage during the pulse interval so as to generate a sawtooth waveform.

If the time constant of integration is selected carefully so that the integrated value does not saturate in a ½ bit symbol, all the integrated values can be discriminated as long as the integration is carried out at a period less than a ½ bit symbol.

If the maximum value of the integrated values is detected in the maximum value detecting circuit 207 during a time interval of ½ bit symbol, the frequency of the base-band signal can be discriminated. Thus obtained base-band signal frequency and the frequency deviation direction of the local oscillator signal are judged in the sign judging circuit 210, making a judgement of "1" or "0".

Furthermore, by waveform-shaping the base-band signal in the limiter amplifier 205 and discriminating the frequency from its edge interval, the base-band signal can be demodulated even in the case the waveform of base-band signal is saturated due to a large amplitude of the carrier wave signal or a distortion of the mixer 203. Therefore, no means such as an automatic gain controller (AGC) is required.

If supposed that the local oscillator signal is offset from the carrier wave signal frequency by an amount of $\Delta f_0$, the frequency of the base-band signal has the following four-kind of frequencies; $|\Delta f_1-\Delta f_2+\Delta f_0|$, $|\Delta f_1-\Delta f_2-\Delta f_0|$, $|\Delta f_1+\Delta f_2+\Delta f_0|$, and $|\Delta f_1+\Delta f_2-\Delta f_0|$.

And, if the values of $\Delta f_1$ and $\Delta f_2$ are known in advance, the frequency offset of the local oscillator signal can be detected by discriminating the maximum frequency ($|\Delta f_1+\Delta f_2+\Delta f_0|$) outputted in the base-band signal.

If the frequency offset is detected and the condition such that $\Delta f_0$ is large, $\Delta f_0+\{f_2>\Delta f_1\}$, and the instantaneous frequency of the local oscillator frequency excurses out of the channel band, the control circuit 211 stops the modulation of the local oscillator signal and deactivates the maximum value detecting circuit. And, the signal from the edge interval detecting circuit is directly inputted into the sign judging circuit 210. By discriminating its base-band signal frequency into $|\Delta f_1+\Delta f_0|$ and $|\Delta f_1-\Delta f_0|$, it can serve as a means for executing the demodulation. By doing such an operation, it becomes possible to prevent the bandwidth required for receiving signals from increasing and therefore a design of the low-pass filter 204 becomes easy.

As is described in the foregoing description in the present invention, by providing a means for FSK-modulating the local oscillator signal and discriminating the frequency on the basis of the period of base-band signal, the FSK signal can be demodulated by the simple circuit constitution including one set of a mixer, a channel filter, and a limiter. Thus, the reduction of size and the electric power consumption saving can be realized.

ELEVENTH EMBODIMENT

Hereinafter, referring to the drawings, an eleventh embodiment of the present invention is explained.

Figure 18:
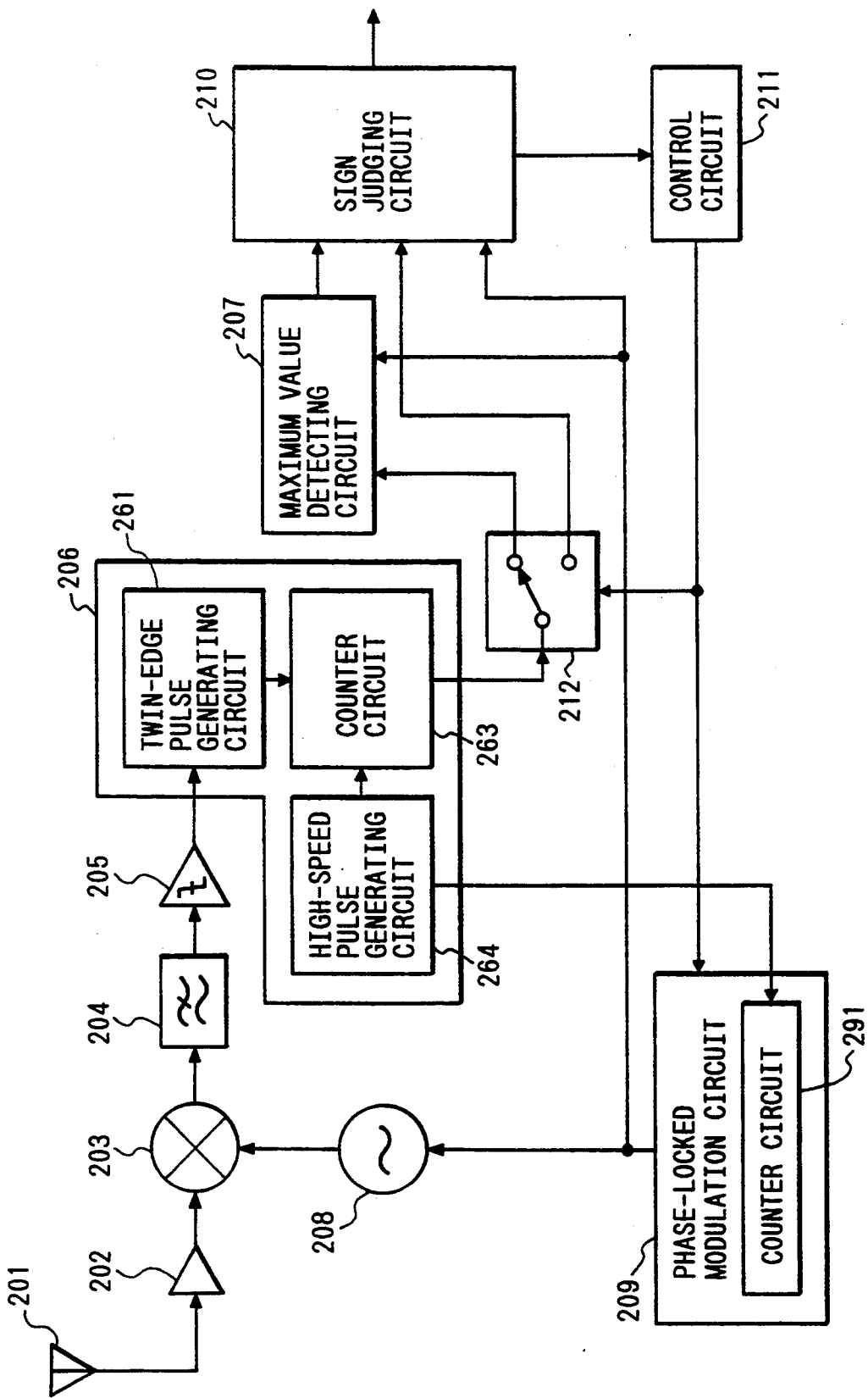
FIG. 18 is a block diagram showing the FSK data receiving apparatus in accordance with an eleventh embodiment of the present invention.
Figure 19:
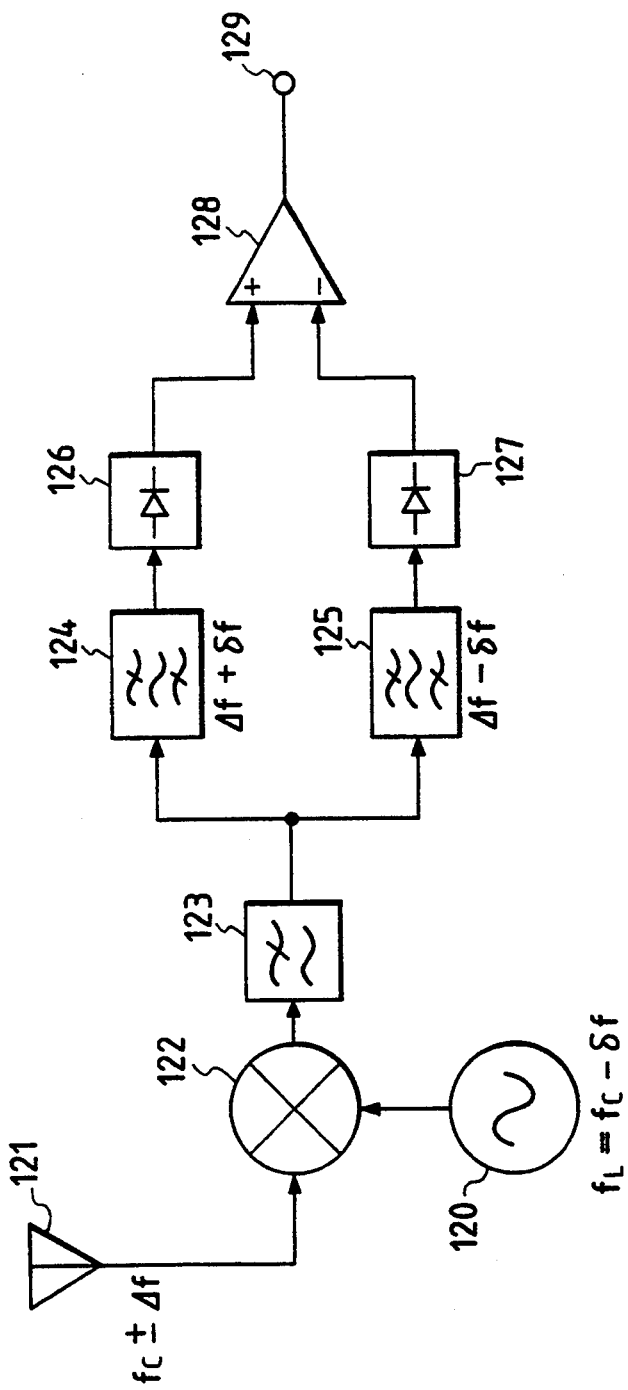
FIG. 19 is a circuit system diagram showing main portions of a receiver embodying a conventional FSK data receiving system.
Figure 20:
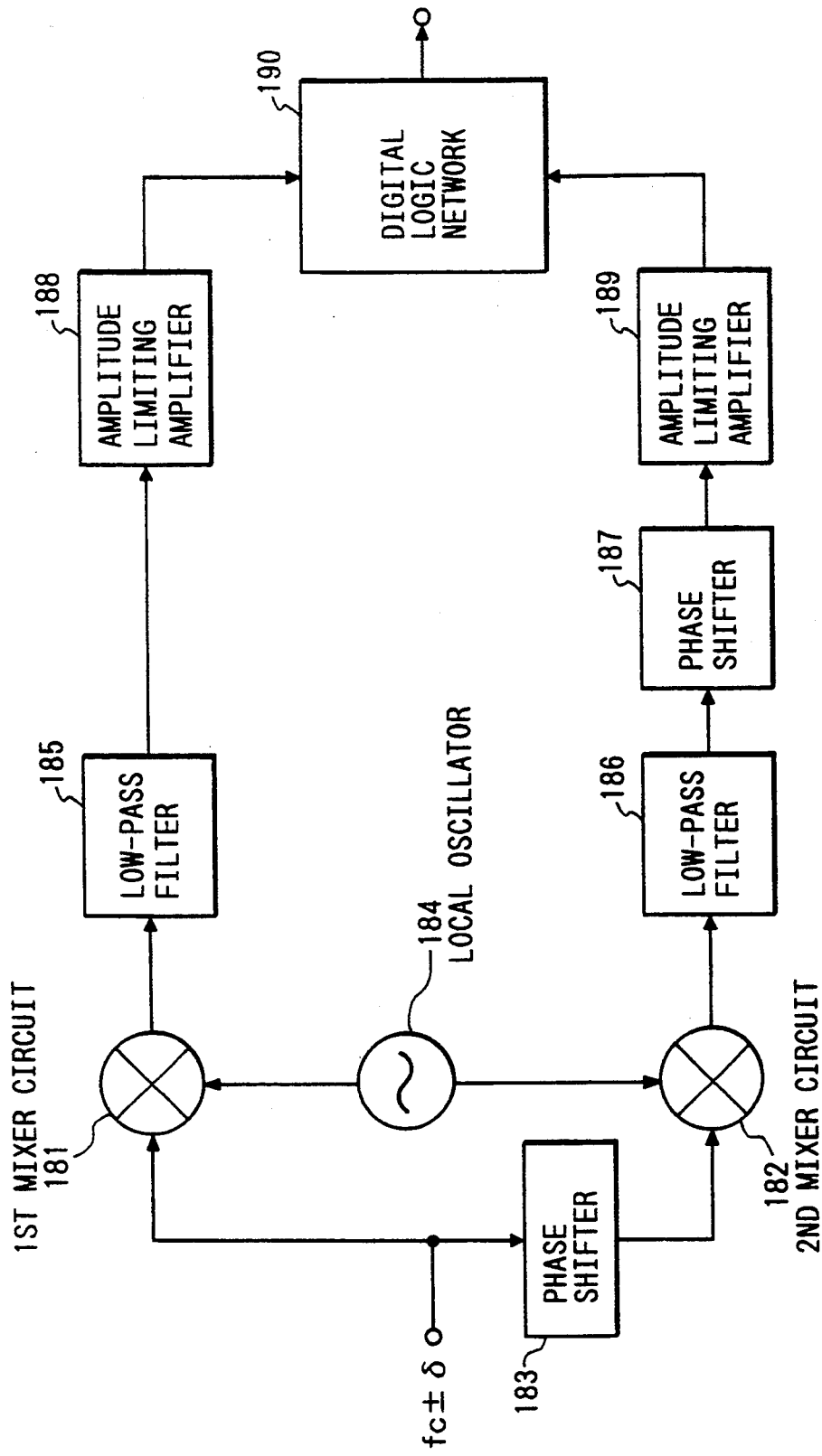
FIG. 20 is a circuit system diagram showing main portions of a demodulation circuit embodying an FSK-demodulation system in accordance with a conventional receiver constitution.
Figure 21:
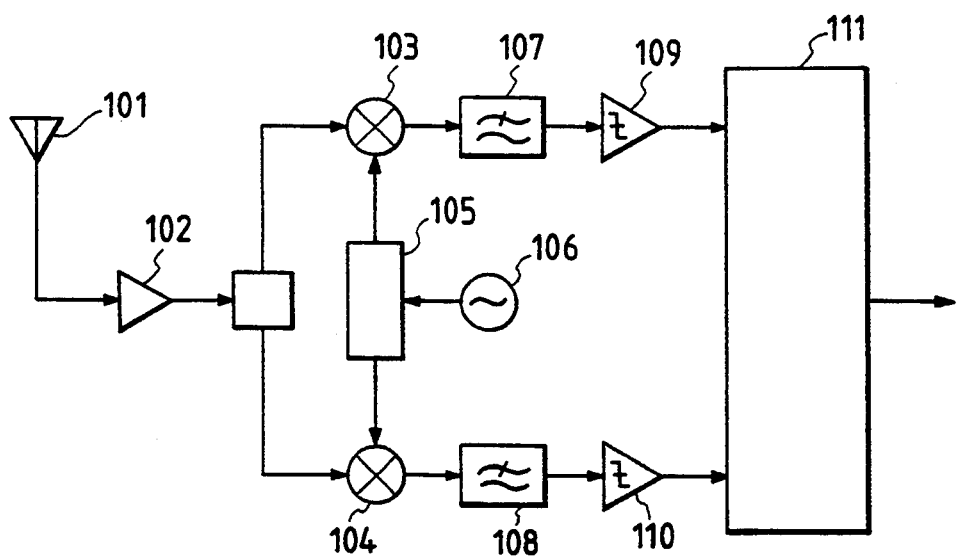
FIG. 21 is a block diagram showing an FSK data receiving apparatus in accordance with a conventional quadrature demodulation system; and, FIG. 22 is a block diagram showing an FSK data receiving apparatus in accordance with a conventional offset system.
Figure 22:
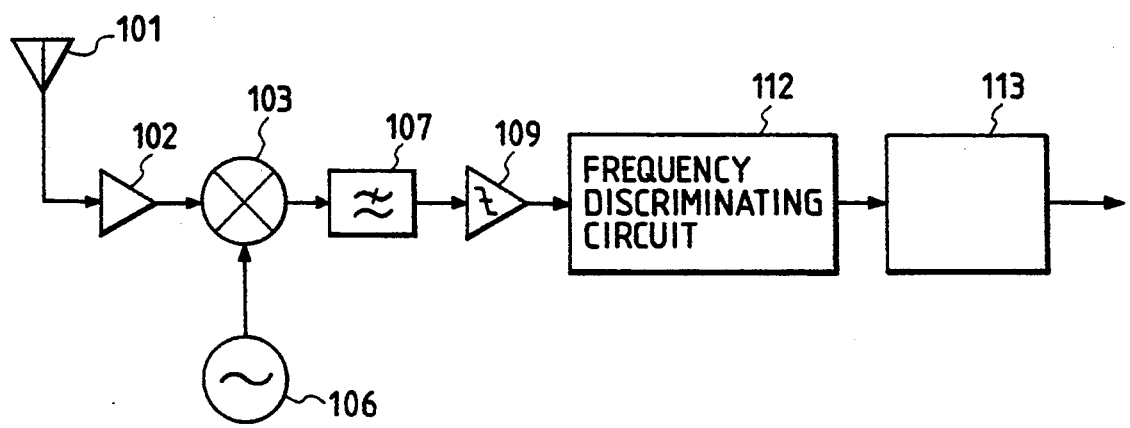

FIG. 18 is a view showing a block diagram of the FSK data receiving apparatus in accordance with the eleventh embodiment of the present invention.

In FIG. 18, a reference numeral 212 denotes a switch circuit, and a reference numeral 261 denotes a twin-edge pulse generating circuit. A reference numeral 263 denotes a counter circuit, and a reference numeral 264 denotes a high-speed pulse generating circuit. A reference numeral 291 denotes a counter circuit.

The constitution of FIG. 18 is different from the constitution of FIGS. 14 and 15 in that a method for counting high-speed pulses generated from the high-speed pulse generating circuit 64 is adopted instead of integrating period information.

In the frequency discriminating circuit constituted as described above, its operation is explained hereinafter. First of all, as well as the tenth embodiment, the twin-edge pulse generating circuit 261 generates pulses at the zero-cross point of the base-band signal. During an interval of these pulses, the counter circuit 263 counts the high-speed pulses generated in the high-speed pulse generating circuit 264.

Each counted value is inputted into the maximum value detecting circuit 207 and, in turn, the maximum value is detected during a ½ bit symbol. This maximum value detecting circuit 207 is easily constituted by the combination of the comparator and the data latch circuit.

The operation of the sign judging circuit is the same as the tenth embodiment. That is, the frequency is discriminated from the period of the base-band signal and, in turn, "1" or "0" is discriminated from the positive/-negative sign of the frequency deviation of the local oscillator signal at that time.

The feature different from the tenth embodiment is to enable to process signals by use of digital signals.

Furthermore, in the case where the frequency offset of the local oscillator is detected as well as the tenth embodiment, the switching circuit 212 is switched in response to the control signal of the control circuit 211 so as to change the signal path of the base-band signal for making a sign judgement.

Furthermore, in the eleventh embodiment, the constitution of the phase-locked circuit can be simplified by using the counter circuit 291 which counts pulses of the high-speed pulse generating circuit 264 by a number corresponding to a ½ bit symbol so as to switch the local oscillator signal frequency. Furthermore, it is needless to say that the high-speed pulse generating circuit 264 can be constituted by using a clock signal of the CPU for controlling the FSK data receiver.

Moreover, it is also needless to mention that, the demodulation can be executed at the timing of the frequency discrimination as long as the maximum frequency can be discriminated.

MISCELLANEOUS

By the way, in any embodiment, it is needless to say that respective comparisons and signal controls need to be adjusted their timings so that above-described operations can be performed correctly.

Though the second f/V judging line 94 of FIG. 9 was explained by taking an example in either one of the higher and the lower sides of the base-band frequency or in both, the second f/V judging line 94 can be used for the comparison in any of the higher side, the lower side, and both sides of base-band signal frequency in any embodiment.

Furthermore, though the type of modulated frequency signal is explained as the FSK-modulated one, it is apparent that the data receiving system in accordance with the present invention can be applied to any signal type which is modulated equivalently by the frequency deviation.

Moreover, in any embodiment, though the receiving system was explained as a direct-conversion receiving system, it is also apparent that, if the carrier wave signal is an intermediate frequency signal, the data receiving system of the present invention can be applied to a heterodyne type receiving system.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An FSK data receiving system comprising:
   a local oscillator for causing oscillation of substantially the same frequency as a carrier wave signal which is FSK (frequency-shift-keyed) modulated with a positive and a negative equi-frequency deviations;
   an FSK-modulated local oscillator signal;
   a phase adjusting circuit for adjusting a phase of the FSK-modulated local oscillator signal and outputting a first output signal to said local oscillator;
   a frequency mixer for mixing frequencies of an output signal of said local oscillator and said carrier wave signal, said frequency mixer generating an output signal to be outputted through a filter as a base-band signal;
   an amplitude limiting amplifier for limiting an amplitude of said base-band signal;
   a pulse count circuit for converting a pulse number of output pulses fed from said limiting circuit into a voltage;
   a voltage comparison circuit for comparing a second output signal fed from said phase adjusting circuit which executes the phase adjustment of said FSK-modulated local oscillator and the voltage from the pulse count circuit, said voltage comparison circuit generating an output signal as a first decode signal; whereby said phase adjusting circuit and said voltage comparison circuit constituting a first decode circuit so as to execute a data demodulation on the basis of said first decode signal.

2. An FSK data receiving system in accordance with claim 1 in which said voltage comparison circuit of the first decode circuit includes a first voltage comparison circuit for comparing the voltages on the basis of a voltage corresponding to a frequency pulse number of an FSK-modulated frequency deviation of the carrier wave signal, and a first exclusive-OR circuit for inputting an output signal of the first voltage comparison circuit and the second output signal of the phase adjusting circuit, and further said FSK-modulated local oscillator signal is used as said first output signal of the phase adjusting circuit and is on the other hand delayed to be used as said second output signal of the phase adjusting circuit.

3. An FSK data receiving system in accordance with claim 1 further comprising a phase-locked adjusting circuit for adjusting said FSK-modulated local oscillator signal to have the same transmission speed as the FSK-modulated frequency deviation of the carrier wave signal with a phase difference of 90 degrees or for adjusting said FSK-modulated local oscillator signal to have a transmission speed twice as large as the FSK-modulated frequency deviation of the carrier wave signal with the same phase, and said voltage comparison circuit of said first decode circuit includes a delayed voltage comparison circuit for judging an increase/decrease of a frequency pulse number in a unit data section of a transmission signal of an FSK-modulated frequency deviation of said carrier wave signal.

4. An FSK data receiving system comprising:
   a local oscillator for causing oscillation of substantially the same frequency as a carrier wave signal which is FSK (frequency-shift-keyed) modulated with a positive and a negative equi-frequency deviations;
   a frequency mixer for mixing frequencies of an output signal of said local oscillator and said carrier wave signal, said frequency mixer generating an output signal to be outputted through a filter as a baseband signal;

a frequency-voltage conversion circuit for converting a frequency of said base-band signal into a form of voltage;

a first decode circuit for judging whether said FSK-modulated frequency deviation of the carrier wave has a positive deviation or a negative deviation, and obtaining a first decode signal;

a voltage judging means for executing a judgment by use of an output from said frequency-voltage conversion circuit as an input voltage;

a control signal generating circuit for obtaining a first control signal based on a signal fed from said voltage judging means;

a second decode circuit which judges whether the first decode signal and an output signal of said voltage judging means are in-phase or opposite-phase on the basis of the output signal of said voltage judging means, and obtains a second decode signal by selecting either of said first decode signal and said output signal of said voltage judging means and switching its inversion/noninversion;

a decode signal processing circuit for inputting said first and second decode signals and obtaining a third decode signal in response to said first control signal, whereby executing a data demodulation by use of the third decode signal.

5. An FSK data receiving system in accordance with claim 4 in which said decode signal processing circuit includes a signal processing means which obtains the first control signal from the control signal generating circuit based on an input signal of said voltage judging means, and obtains the third decode signal by adding said first and second decode signals which are weighted in accordance with said first control signal.

6. An FSK data receiving system in accordance with claim in which said decode signal processing circuit includes a signal processing means which obtains the first control signal from the control signal generating circuit based on an output signal of said voltage judging means, and obtains the third decode signal by switching said first and second decode signals in accordance with said first control signal.

7. AN FSK data receiving system in accordance with claim 7 further including an electric power supply circuit for supplying electric power voltage to the first decode circuit, said control signal generating circuit including means for generating a second control signal for controlling a turning on-and-off of an output voltage fed from said electric power supply circuit, and said electric power supply circuit turning on-and-off the output voltage fed therefrom in response to said second control signal after said second decode signal has been obtained as said third decode signal in response to said first control signal.

8. An FSK data receiving system in accordance with claim 7 further including an electric power supply circuit for supplying electric power voltage to the first decode circuit, said control signal generating circuit including means for generating a second control signal for controlling a turning on-and-off of an output voltage fed from said electric power supply circuit, and means for turning on-and-off the output voltage fed from said electric power supply circuit, together with connection-or-disconnection of an FSK-modulated local oscillator signal to-or-from said local oscillator, in response to said second control signal after said second decode signal has been obtained as said third decode signal in response to said first control signal.

9. An FSK data receiving system in accordance with claim 6 further including an electric power supply circuit for supplying electric power voltage to said second decode circuit, a second control signal for controlling a turning on-and-off of an output voltage fed from said electric power supply circuit as an output signal from said control signal generating circuit, and an intermittent operation control signal acting at intervals at a time width shorter than a time period causing a constant-width frequency offset of the local oscillator, in addition to said first control signal outputted from said control signal generating circuit, and a turning on-and-off of an output voltage fed from said electric power supply circuit is harried out in response to both of said second control signal and said intermittent operation control signal after said first decode signal has been obtained as said third decode signal in accordance with said first control signal.

10. An FSK data receiving system in accordance with claim 4 in which said voltage judging means includes a first and a second voltage judging circuits, and said first voltage judging circuit is connected to the control signal generating circuit, and further said second decode signal is obtained by executing a judgement of in-phase/opposite-phase relationship, a signal selection, and its inversion/non-inversion switching on the basis of both an output signal of said second voltage judging circuit and said first decode signal.

11. An FSK data receiving system in accordance with claim 10 in which the output signal of said second voltage judging circuit is substituted by an output signal of said first voltage judging circuit means.

12. An FSK data receiving system in accordance with claim 10 in which said control signal generating circuit includes a means for holding an output signal of said first voltage judging circuit for a certain period of time and processing this signal before being subsequently outputted.

13. An FSK data receiving system in accordance with claim 4 in which said control signal generating circuit includes a means for responding to the output signal of the voltage judging means so as to judge and generate an output signal by taking a summation or an average of voltages in a unit data section of a transmission signal of the FSK-modulated frequency deviation of the carrier wave signal.

14. An FSK data receiving system in accordance with claim 4 in which said control signal generating circuit includes a means for holding judgement results in several unit data sections of a transmission signal of the FSK-modulated frequency deviation of the carrier wave signal obtained by the output signal of the voltage judging means, so as to obtain an exclusive-OR result.

15. An FSK data receiving system in accordance with claim 4 in which said control signal generating circuit includes a means for obtaining an exclusive-OR result by executing judgements at both of a higher and a lower sides of an output voltage on the basis of the output signal of the voltage judging means in a unit data section of a transmission signal of the FSK-modulated frequency deviation of the carrier wave signal.

16. An FSK data receiving system in accordance with claim 10 in which said second decode circuit includes an in-phase/opposite-phase judging circuit for judging in-phase/opposite-phase relationship between said first decode signal and the output signal of said second voltage judging circuit, on the basis of the output signal of said first and second voltage judging circuit, and a signal inversion & selection circuit for selecting anyone of the output signal of said second voltage judging circuit, an inversion signal of the output of said second voltage judging circuit, and the first decode signal in accordance with the output signal of said in-phase/opposite-phase Judging circuit, and further it is judged whether the FSK-modulated frequency has a positive deviation or a negative deviation on the basis of both a frequency change of the base-band signal by the output signal of said first voltage judging circuit and a positive/negative direction judgment of a frequency offset of the local oscillator by said in-phase/opposite-side judging circuit and said signal inversion & selection circuit, so that the second decode signal can be obtained as an output signal of said signal inversion & selection circuit.

17. An FSK data receiving system in accordance with claim 16 in which;
   in one side of the upper and the lower sides of the output signal of the second voltage judging circuit, said in-phase/opposite-phase judging circuit judges in-phase/opposite-phase relationship between the output signal of said second voltage judging circuit and the first decode signal, and said signal inversion & selection circuit includes a first and a second switching circuits and an in-phase control circuit, said first switching circuit responds to the output signal of said in-phase/opposite-phase judging circuit to invert the output signal of said second voltage judging circuit in case of opposite-phase and not to invert it in case of in-phase, and said in-phase control circuit responds to the output signal of said in-phase/opposite-phase judging circuit to output said first decode signal from the second switching circuit in case of in-phase and to output an output signal of the first switching circuit from the second switching circuit in case of opposite-phase;
   in the other side of the upper and the lower sides of the output signal of the second voltage judging circuit, the switching by the output signal of said in-phase/opposite-phase judging circuit is not carried out, and the previous condition of said first switching circuit is kept, and the output signal of said second voltage judging circuit is outputted through said first and second switching circuits as the second decode signal.

18. An FSK data receiving system in accordance with claim 10 in which said second decode circuit includes an in-phase/opposite-phase judging circuit for judging in-phase/opposite-phase relationship between said first decode signal and the output signal of said second voltage judging circuit on the basis of the output signals of said first and second voltage judging circuits, and a signal inversion & selection circuit for selecting the output signal of said second voltage judging circuit or an inversion signal of the output of said second voltage judging circuit in accordance with the output signal of said in-phase/opposite-phase judging circuit, and further it is judged whether the FSK-modulated frequency has a positive deviation or a negative deviation on the basis of a frequency change of the base-band signal by the output signal of said second voltage judging circuit and a positive/negative direction judgement of a frequency offset of the local oscillator by said in-phase/opposite-side judging circuit and said signal inversion & selection circuit, so that the second decode signal can be obtained as an output signal of said signal inversion & selection circuit.

19. An FSK data receiving system in accordance with claim 18 in which;
   in one of the upper and the lower sides of the output signal of the second voltage judging circuit, said in-phase/opposite-phase judging circuit judges in-phase/opposite-phase relationship between the output signal of said second voltage judging circuit and the first decode signal, and said signal inversion & selection circuit responds to the output signal of said in-phase/opposite-phase judging circuit to invert the output signal of said second voltage judging circuit in case of opposite-phase and not to invert it in case of in-phase so that the second decode signal can be obtained as an output of said signal inversion & selection circuit;
   in the other side of the upper and the lower sides of the output signal of the second voltage judging circuit, an output signal is obtained from the output signal of said second voltage judging circuit by said signal inversion & selection circuit holding the switching of inversion/non-inversion, so that said output signal becomes said second decode signal.

20. An FSK data receiving system in accordance with claim 16 in which said signal inversion & selection circuit includes an exclusive-OR circuit.

21. An FSK data receiving system in accordance with claim 16 in which said in-phase/opposite-phase judging circuit includes a D-type flip-flop circuit which has a D-input terminal inputting the first decode signal and a clock-input terminal inputting the output signal of the first or the second voltage judging circuit, which is delayed from said first decode signal,, and then a signal obtained by inverting an output signal of said D-type flip-flop circuit is obtained as an output.

22. An FSK demodulation system comprising:
   first and a second base-band signals whose phases are mutually quadrature and are also relatively inverted on the basis of a positive or a negative frequency deviation of an FSK-modulated signal;
   a first decode circuit for judging whether the frequency deviation of said FSK-modulated signal is a positive or a negative to output a first decode signal;
   a frequency-voltage conversion circuit for converting a frequency of said first or second base-band signal into a form of voltage;
   a voltage judging means for executing a judgment by use of an output from said frequency-voltage conversion circuit as an input voltage;
   a control signal generating circuit for obtaining a first control signal based on a signal fed from said voltage judging means;
   a second decode circuit which judges whether the first decode signal and an output signal of said voltage judging means are in-phase or opposite-phase on the basis of the output signal of said voltage judging means, and obtains a second decode signal by selecting either of said first decode signal and said output signal of said voltage judging means and switching its inversion/noninversion;
   a decode signal processing circuit for inputting said first and second decode signals and obtaining a third decode signal in response to said first control signal, whereby executing a data demodulation by use of the third decode signal.

23. An FSK demodulation system in accordance with claim 22 in which said decode signal processing circuit includes a signal processing means which obtains the first control signal from the control signal generating circuit based on an input signal of said voltage judging means, and obtains the third decode signal by adding said first and second decode signals which are weighted in accordance with said first control signal.

24. An FSK demodulation system in accordance with claim 22 in which said decode signal processing circuit includes a signal processing means which obtains the first control signal from the control signal generating circuit based on an output signal of said voltage judging means, and obtains the third decode signal by switching said first and second decode signals in accordance with said first control signal.

25. An FSK demodulation system in accordance with claim 24 further including an electric power supply circuit for supplying electric power voltage to a frequency mixer of a local oscillator frequency band for obtaining either of said first and second base-band signals and also for supplying electric power voltage to the first decode circuit, said control signal generating circuit including means for generating a second control signal for controlling a turning on-and-off of an output voltage fed from said electric power supply circuit, and said electric power supply circuit turning on-and-off the output voltage fed therefrom in response to said second control signal after said second decode signal has been obtained as said third decode signal in response to said first control signal.

26. An FSK data receiving system in accordance with claim 24 further including an electric power supply circuit for supplying electric power voltage to the frequency-voltage conversion circuit, the voltage judging means, and the second decode circuit, said control signal generating circuit including means for generating a second control signal for controlling a turning on-and-off of an output voltage fed from said electric power supply circuit and an intermittent operation control signal acting at intervals at a time width shorter than a time period causing a constant-width frequency offset of the local oscillator, and means for turning on-and-off the output voltage from said electric power supply circuit in response to both of said second control signal and said intermittent operation control signal after said first decode signal has been obtained as said third decode signal in accordance with said first control signal.

27. An FSK demodulation system in accordance with claim 22 in which said voltage judging means includes a first and a second voltage judging circuits, and said first voltage judging circuit is connected to the control signal generating circuit, and further said second decode signal is obtained by executing a judgement of in-phase/opposite-phase relationship, a signal selection, and its inversion/non-inversion switching on the basis of both an output signal of said second voltage judging circuit and said first decode signal.

28. An FSK demodulation system in accordance with claim 27 in which the output signal of said second voltage judging circuit is substituted by an output signal of said first voltage judging circuit means.

29. An FSK demodulation system in accordance with claim 27 in which said control signal generating circuit includes a means for holding an output signal of said first voltage judging circuit for a certain period of time and processing this signal before being subsequently outputted.

30. An FSK demodulation system in accordance with claim 28 in which said second decode circuit includes an in-phase/opposite-phase judging circuit for judging in-phase/opposite-phase relationship between said first decode signal and the output signal of said second voltage Judging circuit on the basis of the output signal of said first or second voltage judging circuit, and a signal inversion & selection circuit for selecting any one of the output signal of said second voltage judging circuit, an inversion signal of the output of said second voltage judging circuit, and the first decode signal in accordance with the output signal of said in-phase/opposite-phase judging circuit, and further it is judged whether the FSK-modulated frequency has a positive deviation or a negative deviation on the basis of both a frequency change of the first or second base-band signal by the output signal of said first voltage judging circuit and a positive/negative direction judgment of a frequency offset of the local oscillator by said in-phase/opposite-side judging circuit and said signal inversion & selection circuit, so that the second decode signal can be obtained as an output signal of said signal inversion & selection circuit.

31. An FSK demodulation system in accordance with claim 30 in which;

in one side of the upper side and the lower side of the output signal of the second voltage judging circuit, said in-phase/opposite-phase judging circuit judges in-phase/opposite-phase relationship between the output signal of said second voltage judging circuit and the first decode signal, and said signal inversion & selection circuit includes a first and a second switching circuits and an in-phase control circuit, said first switching circuit responds to the output signal of said in-phase/opposite-phase judging circuit to invert the output signal of said second voltage judging circuit in case of opposite-phase and not to invert it in case of in-phase, and said in-phase control circuit responds to the output signal of said in-phase/opposite-phase judging circuit to output said first decode signal from the second switching circuit in case of in-phase and to output an output signal of the first switching circuit from the second switching circuit in case of opposite-phase;

in the other side of the upper side and the lower side of the output signal of the second voltage judging circuit, the switching by the output signal of said in-phase/opposite-phase judging circuit is not carried out, and the previous condition of said first switching circuit is kept, and the output signal of said second voltage judging circuit is outputted through said first and second switching circuits as the second decode signal.

32. An FSK demodulation system in accordance with claim 27 in which said second decode circuit includes an in-phase/opposite-phase judging circuit for judging in-phase/opposite-phase relationship between said first decode signal and the output signal of said second voltage judging circuit on the basis of the output signals of said first or second voltage judging circuit, and a signal inversion & selection circuit for selecting the output signal of said second voltage judging circuit or an inversion signal of the output of said second voltage judging circuit in accordance with the output signal of said in-phase/opposite-phase judging circuit, and further it is judged whether the FSK-modulated frequency has a positive deviation or a negative deviation on the basis of a frequency change of a first or a second base-band signal -by the output signal of said second voltage judging circuit and a positive/negative direction judgement of a frequency offset of the local oscillator by said in-phase/opposite-side judging circuit and-said signal inversion & selection circuit, so that the second decode signal can be obtained as an output signal of said signal inversion & selection circuit.

33. An FSK demodulation system in accordance with claim 33 in which;
   in one of the upper side and the lower side of the output signal of the second voltage judging circuit, said in-phase/opposite-phase judging circuit judges in-phase/opposite-phase relationship between the output signal of said second voltage judging circuit and the first decode signal, and said signal inversion & selection circuit responds to the output signal of said in-phase/opposite-phase judging circuit to invert the output signal of said second voltage judging circuit in case of opposite-phase and not to invert it in case of in-phase so that the second decode signal can be obtained as an output of said signal inversion & selection circuit;
   in the other side of the upper side and the lower side of the output signal of the second voltage judging circuit, an output signal is obtained from the output signal of said second voltage judging circuit by said signal inversion & selection circuit holding the switching of inversion/noninversion, so that said output signal becomes said second decode signal.

34. An FSK demodulation system in accordance with claim 30 in which said signal inversion & selection circuit includes an exclusive-OR circuit.

35. An FSK demodulation system in accordance with claim 30 in which said in-phase/opposite-phase judging circuit includes a D-type flip-flop circuit which has a D-input terminal inputting the first decode signal and a clock-input terminal inputting the output signal of the first or the second voltage judging circuit, which is delayed from said first decode signal, and then a signal obtained by inverting an output signal of said D-type flip-flop circuit is obtained as an output.

36. An FSK data receiving apparatus comprising:
   a local oscillator for causing oscillation of substantially the same frequency as a carrier wave signal which is modulated with a positive and a negative equi-frequency deviations;
   a frequency mixer for converting a local oscillator signal outputted from a local oscillator circuit and said carrier wave signal into base-band signals;
   a phase-locked modulation circuit which modulates a frequency of the local oscillator signal with a deviation by giving a 90-degree phase difference at the same transmission speed as an FSK-modulated frequency deviation of said carrier wave or by phase-locking at a twice as large transmission speed as the FSK-modulated frequency deviation of said carrier wave when the local oscillator signal outputted from the local oscillator circuit and said carrier wave signal are converted into base-band signals;
   said local oscillator being supplied with an output signal of the phase-locked modulation circuit and outputting frequency modulated deviation signal as said local oscillator signal;
   an amplitude limiting amplifier circuit for shaping a waveform of the base-band signal into a rectangular waveform;
   an edge interval detecting circuit for detecting a building-up and a trailing-edge of an output signal from the amplitude limiting amplifier circuit so as to output a voltage or a numerical value in accordance with its edge interval;
   a maximum value detecting circuit for detecting a maximum value of an output signal from the phase-locked modulation circuit at time intervals of a half of a period during which the output of said phase-locked modulation circuit changes between its high-value and its low-value in the case where the modulation of the local oscillator signal is the same as the transmission speed of the frequency deviation in the frequency deviation of the carrier wave signal, or at time intervals of the period during which the output of said phase-locked modulation circuit changes between its high-value and its low-value in the case where the modulation of the local oscillator signal is twice as large as the transmission speed of the frequency deviation in the frequency deviation of the carrier wave signal;
   a sign judging circuit which discriminates a frequency of the base-band signal on the basis of an output from said maximum value detecting circuit, discriminates whether a sign of frequency deviation of the local oscillator is positive or negative on the basis of the phase-locked modulation circuit, and makes a sign judgement on the basis of interrelation of the frequency of the base-band signal and positive/negative of frequency deviation of the local oscillator signal.

37. An FSK data receiving apparatus in accordance with claim 36 in which said edge interval detecting circuit includes a twin-edge pulse generating circuit which detects edges of the building-up and the trailing-edge of the baseband signal of rectangular waveform to output a pulse, and a pulse interval detecting circuit for outputting a voltage or a numerical value in accordance with the pulse outputted from the twin-edge pulse generating circuit.

38. An FSK data receiving apparatus in accordance with claim 36 in which said edge interval detecting circuit includes an integration circuit which detects edges of the building-up and the trailing-edge of the base-band signal of rectangular waveform to integrate a constant voltage at said edge interval, in order to output a voltage value in accordance with said edge interval.

39. An FSK data receiving apparatus in accordance with claim 38 in which said phase-locked modulation circuit has a counter circuit for counting pulses of a high-speed pulse generating circuit by a number corresponding to $\frac{1}{2}$ data symbol with respect to the transmission speed, so as to begins its counting from a timing the sign of the frequency deviation of the carrier wave signal changes, and the local oscillator signal is modulated to have a 90-degree phase difference at the same speed as the transmission speed of said carrier wave signal or to be phase-locked at a twice as large transmission speed as said carrier wave signal.

40. An FSK data receiving apparatus in accordance with claim 36 in which said edge interval detecting circuit includes a high-speed pulse generating circuit generating frequency pulses higher than the base-band signal and a counter circuit which detects edges of the building-up and the trailing-edge of the base-band signal of rectangular waveform and counts output pulse number from said high-speed pulse generating circuit at said edge interval, so that a numerical value can be outputted in accordance with said edge interval.

41. An FSK data receiving apparatus in accordance with claim 40 in which a clock of a CPU controlling an operation of the FSK data receiving apparatus is utilized as said high-speed pulse generating circuit.

42. An FSK data receiving apparatus in accordance with claim 40 in which said phase-locked modulation circuit has a counter circuit for counting pulses of a high-speed pulse generating circuit by a number corresponding to ½ data symbol with respect to the transmission speed, so as to begins its counting from a timing the sign of the frequency deviation of the carrier wave signal changes, and the local oscillator signal is modulated to have a 90-degree phase difference at the same speed as the transmission speed of said carrier wave signal or to be phase-locked at a twice as large transmission speed as said carrier wave signal.

43. An FSK data receiving apparatus in accordance with claim 36 in which said sign judging circuit executes a sign judgement, in the case where the frequency deviation of the carrier wave signal is $\pm \Delta f_1$ and the frequency deviation of the local oscillator signal is $\pm \Delta f_2$ and further no frequency offset exists between said local frequency signal and said carrier wave signal, in such a manner, when the frequency deviation of said local oscillator signal is discriminated as $+\Delta f_2$, the frequency deviation of the carrier wave signal is judged as $-\Delta f_1$ if the base-bans signal is $|\Delta f_1 + \Delta f_2|$, and as $+\Delta f_1$ if the base-bans signal is $|\Delta f_1 - \Delta f_2|$, and further when the frequency deviation of said local oscillator signal is discriminated as $-\Delta f_2$, the frequency deviation of the carrier wave signal is judged as $+\Delta f_1$ if the base-bands signal is $|\Delta f_1 + \Delta f_2|$, and as $-\Delta f_1$ if the base-bans signal is $|\Delta f_1 - \Delta f_2|$.

44. An FSK data receiving apparatus in accordance with claim 42 in which said sign judging circuit includes an exclusive-OR circuit which inputs the output signal from the maximum value detecting circuit and the output signal from the phase-locked modulation circuit.

45. An FSK data receiving apparatus in accordance with claim 36 in which said sign judging circuit includes a control circuit which, in the case the frequency deviation of the carrier wave signal is $\pm \Delta f_1$ and the frequency deviation of the local oscillator signal is $\pm \Delta f_2$ and further some frequency offset exists between said local frequency signal and said carrier wave signal, detects the frequency offset between said local frequency signal and said carrier wave signal and its positive/negative direction, holds them, deactivates said phase-locked modulation circuit and said maximum value detecting circuit when the frequency offset is detected, and changes a signal path so as to input the output signal from the edge interval detecting circuit into the sign judging circuit, and said control circuit executes a sign judgement in such a manner, when the frequency offset of said local oscillator signal is $+\Delta f_0$, the frequency deviation of the carrier wave signal is judged as $-\Delta f_1$ if the base-band signal frequency is $|\Delta f_1 - \Delta f_0|$, if the base-band signal frequency is $|\Delta f_1 - \Delta f_0|$, and further when the frequency offset of said local oscillator signal is $-\Delta f_0$, the frequency deviation of the carrier wave signal is judged as $+\Delta f_1$ if the base-band signal frequency is $|\Delta f_1 + \Delta f_0|$, and as $-\Delta f_1$ if the base-band signal is $|\Delta f_1 - \Delta f_0|$.

46. An FSK data receiving apparatus in accordance with claim 44 in which said sign judging circuit includes an exclusive-OR circuit which inputs the output signal from the edge-interval detecting circuit and the output signal from the phase-locked modulation circuit, 47. An FSK data receiving system in accordance with claim 18 in which said signal inversion & selection circuit includes an exclusive-OR circuit.

48. An FSK data receiving system in accordance with claim 18 in which said in-phase/opposite-phase judging circuit includes a D-type flip-flop circuit which has a D-input terminal inputting the first decode signal and a clock-input terminal inputting the output signal of the first or the second voltage judging circuit, which is delayed from said first decode signal, and then a signal obtained by inverting an output signal of said D-type flip-flop circuit is obtained as an output.

49. An FSK demodulation system in accordance with claim 32 in which said signal inversion & selection circuit includes an exclusive-OR circuit.

50. An FSK demodulation system in accordance with claim 32 in which said in-phase/opposite-phase judging circuit includes a D-type flip-flop circuit which has a D-input terminal inputting the first decode signal and a clock-input terminal inputting the output signal of the first or the second voltage judging circuit, which is delayed from said first decode signal, and then a signal obtained by inverting an output signal of said D-type flip-flop circuit is obtained as an output.

* * * * *